US008990705B2

(12) United States Patent
Finn et al.

(10) Patent No.: US 8,990,705 B2
(45) Date of Patent: Mar. 24, 2015

(54) COLOR MODIFICATIONS OF OBJECTS IN A VIRTUAL UNIVERSE BASED ON USER DISPLAY SETTINGS

(75) Inventors: Peter George Finn, Brampton (CA); Rick Allen Hamilton, II, Charlottesville, VA (US); Brian Marshall O'Connell, Cary, NC (US); Clifford Alan Pickover, Yorktown Heights, NY (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1226 days.

(21) Appl. No.: 12/165,922

(22) Filed: Jul. 1, 2008

(65) Prior Publication Data
US 2010/0005423 A1 Jan. 7, 2010

(51) Int. Cl.
*G06F 3/00* (2006.01)
*G06F 3/0481* (2013.01)

(52) U.S. Cl.
CPC .................................. *G06F 3/04815* (2013.01)
USPC ............................ 715/744; 715/706; 715/849

(58) Field of Classification Search
USPC .................................. 715/849, 745, 757, 744
See application file for complete search history.

(56) References Cited

U.S. PATENT DOCUMENTS

| 5,862,426 | A | 1/1999 | Ichino et al. |
| 6,023,270 | A | 2/2000 | Brush, II et al. |
| 6,036,601 | A | 3/2000 | Heckel |
| 6,349,301 | B1 | 2/2002 | Mitchell et al. |
| 6,394,301 | B1 | 5/2002 | Koch |
| 6,421,047 | B1 | 7/2002 | deGroot |
| 6,454,652 | B2 | 9/2002 | Miyamoto et al. |
| 6,532,007 | B1 | 3/2003 | Matsuda |
| 6,570,563 | B1 | 5/2003 | Honda |
| 6,580,811 | B2 | 6/2003 | Maurer et al. |
| 6,749,510 | B2 | 6/2004 | Giobbi |
| 6,788,946 | B2 | 9/2004 | Winchell et al. |
| 6,798,407 | B1 | 9/2004 | Benman |
| 6,868,389 | B1 | 3/2005 | Wilkins et al. |

(Continued)

FOREIGN PATENT DOCUMENTS

| JP | 09-211536 | 8/1997 |
| JP | 10-068984 | 3/1998 |

(Continued)

OTHER PUBLICATIONS

NWN Wiki ( Trap, pp. 1-3 via waybackmachine Nov. 12, 2007).*

(Continued)

*Primary Examiner* — Omar Abdul-Ali
*Assistant Examiner* — Sherrod Keaton
(74) *Attorney, Agent, or Firm* — Lisa J. Ulrich; Yee & Associates, P.C.

(57) ABSTRACT

Modifying display of an object in a display of part of a virtual universe is provided. In one embodiment, the process obtains avatar tracking data that identifies a location of an avatar in relation to a range of the object. The range includes a viewable field. The process then selects a data collection method based on the location of the set of avatars. In response to detecting an event for triggering modification of the object, the process calculates a set of color modifiers based on display setting data to form a modified color. Thereafter, the process renders the object using the modified color when the location of the set of avatars is within the range of the object.

20 Claims, 14 Drawing Sheets

(56) References Cited

U.S. PATENT DOCUMENTS

| | | |
|---|---|---|
| 6,895,406 B2 | 5/2005 | Fables et al. |
| 6,954,728 B1 | 10/2005 | Kusumoto et al. |
| 6,981,220 B2 | 12/2005 | Matsuda |
| 7,025,675 B2 | 4/2006 | Fogel et al. |
| 7,158,135 B2 | 1/2007 | Santodomingo et al. |
| 7,305,691 B2 | 12/2007 | Cristofalo |
| 7,320,031 B2 | 1/2008 | Konig et al. |
| 7,454,065 B2 | 11/2008 | Satoh |
| 7,479,967 B2 | 1/2009 | Bachelder et al. |
| 7,542,040 B2 | 6/2009 | Templeman |
| 7,685,204 B2 | 3/2010 | Rogers |
| 7,720,835 B2 | 5/2010 | Ward et al. |
| 7,805,680 B2 | 9/2010 | Meyers et al. |
| 7,822,687 B2 | 10/2010 | Brillon et al. |
| 8,001,161 B2 | 8/2011 | Finn et al. |
| 8,147,149 B2 | 4/2012 | Hirabayashi et al. |
| 8,184,116 B2 | 5/2012 | Finn et al. |
| 8,203,503 B2 | 6/2012 | Castellar et al. |
| 8,212,809 B2 | 7/2012 | Finn et al. |
| 8,233,005 B2 | 7/2012 | Finn et al. |
| 8,259,100 B2 | 9/2012 | Finn et al. |
| 8,458,603 B2 | 6/2013 | Finn et al. |
| 8,466,931 B2 | 6/2013 | Finn et al. |
| 8,471,843 B2 | 6/2013 | Finn et al. |
| 2001/0033675 A1 | 10/2001 | Maurer et al. |
| 2001/0046896 A1* | 11/2001 | Miyamoto et al. ............ 463/31 |
| 2002/0024532 A1 | 2/2002 | Fables et al. |
| 2002/0056091 A1 | 5/2002 | Bala et al. |
| 2002/0107072 A1 | 8/2002 | Giobbi |
| 2002/0113809 A1 | 8/2002 | Akazawa et al. |
| 2002/0138607 A1 | 9/2002 | O'Rourke et al. |
| 2002/0169644 A1 | 11/2002 | Greene |
| 2003/0004774 A1 | 1/2003 | Greene et al. |
| 2003/0084094 A1* | 5/2003 | Shim et al. ............ 709/203 |
| 2003/0091229 A1* | 5/2003 | Edge et al. ............ 382/162 |
| 2003/0120584 A1 | 6/2003 | Zarefoss et al. |
| 2004/0030741 A1 | 2/2004 | Wolton et al. |
| 2004/0034561 A1 | 2/2004 | Smith |
| 2004/0053690 A1 | 3/2004 | Fogel et al. |
| 2004/0165880 A1 | 8/2004 | Ichino |
| 2004/0166935 A1 | 8/2004 | Gavin et al. |
| 2004/0210634 A1 | 10/2004 | Ferrer et al. |
| 2004/0220850 A1 | 11/2004 | Ferrer et al. |
| 2005/0071306 A1 | 3/2005 | Kruszewski et al. |
| 2005/0086112 A1 | 4/2005 | Shkedi |
| 2005/0086605 A1 | 4/2005 | Ferrer et al. |
| 2005/0114198 A1 | 5/2005 | Koningstein et al. |
| 2005/0125229 A1 | 6/2005 | Kurzweil |
| 2005/0151728 A1* | 7/2005 | Nenonen ............ 345/204 |
| 2005/0156928 A1 | 7/2005 | Santodomingo et al. |
| 2005/0179685 A1 | 8/2005 | Kake et al. |
| 2005/0253872 A1 | 11/2005 | Goss et al. |
| 2005/0264566 A1 | 12/2005 | Sommers |
| 2005/0264567 A1 | 12/2005 | Sommers |
| 2005/0286769 A1 | 12/2005 | Satoh |
| 2006/0098975 A1 | 5/2006 | Kobayashi |
| 2006/0130095 A1* | 6/2006 | Willis et al. ............ 725/42 |
| 2006/0168143 A1 | 7/2006 | Moetteli |
| 2006/0194632 A1 | 8/2006 | Hendrickson et al. |
| 2006/0195462 A1 | 8/2006 | Rogers |
| 2006/0258462 A1 | 11/2006 | Cheng et al. |
| 2007/0003915 A1 | 1/2007 | Templeman |
| 2007/0035561 A1 | 2/2007 | Bachelder et al. |
| 2007/0043616 A1 | 2/2007 | Kutaragi et al. |
| 2007/0100650 A1 | 5/2007 | Ramer et al. |
| 2007/0191104 A1 | 8/2007 | Van Luchene |
| 2007/0236516 A1* | 10/2007 | Castellar et al. ............ 345/690 |
| 2007/0247979 A1 | 10/2007 | Brillon et al. |
| 2007/0252841 A1 | 11/2007 | Kim |
| 2007/0261109 A1 | 11/2007 | Renaud et al. |
| 2008/0004119 A1 | 1/2008 | Van Luchene et al. |
| 2008/0007563 A1* | 1/2008 | Aronson et al. ............ 345/589 |
| 2008/0025719 A1 | 1/2008 | Uehara |
| 2008/0252716 A1 | 10/2008 | Kano et al. |
| 2008/0281622 A1 | 11/2008 | Hoal |
| 2009/0063168 A1 | 3/2009 | Finn et al. |
| 2009/0089157 A1* | 4/2009 | Narayanan ............ 705/14 |
| 2009/0227368 A1 | 9/2009 | Wyatt |
| 2009/0254417 A1 | 10/2009 | Beilby et al. |
| 2009/0267937 A1 | 10/2009 | Finn et al. |
| 2009/0267948 A1 | 10/2009 | Finn et al. |
| 2009/0267950 A1 | 10/2009 | Finn et al. |
| 2009/0267960 A1 | 10/2009 | Finn et al. |
| 2009/0271422 A1 | 10/2009 | Finn et al. |
| 2009/0299960 A1* | 12/2009 | Lineberger ............ 707/3 |
| 2009/0327219 A1 | 12/2009 | Finn et al. |
| 2010/0001993 A1 | 1/2010 | Finn et al. |
| 2010/0177117 A1 | 7/2010 | Finn et al. |
| 2010/0205179 A1 | 8/2010 | Carson et al. |
| 2010/0322616 A1 | 12/2010 | Hirabayashi et al. |
| 2012/0266088 A1 | 10/2012 | Finn et al. |
| 2013/0283191 A1 | 10/2013 | Finn et al. |

FOREIGN PATENT DOCUMENTS

| | | |
|---|---|---|
| JP | 10-319475 | 12/1998 |
| JP | 2004258120 | 9/2004 |
| JP | 2005070594 | 3/2005 |
| JP | 2005308810 | 11/2005 |
| JP | 2006018144 | 1/2006 |
| JP | 2008033152 | 2/2008 |

OTHER PUBLICATIONS

NWN Wiki; Trap pp. 1-3 dated Nov. 12, 2007.*
USPTO Office Action dated Aug. 24, 2011 for U.S. Appl. No. 12/353,656.
USPTO office action for U.S. Appl. No. 12/109,023 dated Dec. 1, 2010.
USPTO office action for U.S. Appl. No. 12/168,657 dated Apr. 26, 2011.
USPTO notice of allowance for U.S. Appl. No. 12/109,023 dated Apr. 13, 2011.
USPTO Office Action for U.S. Appl. No. 12/109,040 dated Feb. 3, 2011.
PTO Office Action for U.S. Appl. No. 12/109,040 dated Jul. 15, 2011.
Kiss et al., "Viewpoint Adaptation During Navigation Based on Stimuli from the Virtual Environment" Web3D 03' Proceedings of the Eighth International Conference on 3D Web Technology, ACM, New York, NY, 2003, p. 23.
U.S. Appl. No. 12/108,925, filed Apr. 24, 2008, Finn et al.
U.S. Appl. No. 12/108,968, filed Apr. 24, 2008, Finn et al.
U.S. Appl. No. 12/108,987, filed Apr. 24, 2008, Finn et al.
U.S. Appl. No. 12/109,010, filed Apr. 24, 2008, Finn et al.
U.S. Appl. No. 12/109,023, filed Apr. 24, 2008, Finn et al.
U.S. Appl. No. 12/109,040, filed Apr. 24, 2008, Finn et al.
U.S. Appl. No. 12/168,657, filed Jul. 7, 2008, Finn et al.
U.S. Appl. No. 11/846,724, filed Aug. 29, 2007, Finn et al.
Notice of Allowance, dated Feb. 21, 2012, regarding U.S. Appl. No. 12/108,968, 21 pages.
Notice of Allowance, dated Mar. 16, 2012, regarding U.S. Appl. No. 12/108,987, 21 pages.
Gladestrider, "ZAM Everquest Classes: The Ranger—Tracking-Help," http://everquest.allakhazam.com/db/classes.html?=10 &mid=1098807428716491276, dated Oct. 26, 2004, 2 pages.
Riddikulus, "Dungeons and Dragons Online Eberron Unlimited Forums: Repeating quests-limit?" http://forums.ddo.com/showthread.php?t=123676, dated Oct. 8, 2007, 6 pages.
USPTO Notice of Allowance regarding U.S. Appl. No. 12/108,925, dated Dec. 29, 2011, 18 pages.
USPTO Office Action regarding U.S. Appl. No. 12/108,987, dated Dec. 1, 2011, 39 pages.
USPTO Office Action regarding U.S. Appl. No. 12/109,010, dated Jan. 30, 2012, 43 pages.
USPTO Final Office Action regarding U.S. Appl. No. 12/353,656, dated Dec. 23, 2011, 47 pages.
Avatar-Based Marketing: The Avatar-Based Panel (Part One of Five), New World Notes, http://nwn.blogs.com/nwn/2006/06/avatarbased_mar.html, accessed Nov. 10, 2011, 15 pages.

(56) References Cited

OTHER PUBLICATIONS

Avatar-Based Marketing: The Avatar-Based Panel (Part Two of Five), New World Notes, http://nwn.blogs.com/nwn/2006/06/avatarbased_mar.html, accessed Nov. 10, 2011, 6 pages.
Avatar-Based Marketing: The Avatar-Based Panel (Part Three of Five), New World Notes, http://nwn.blogs.com/nwn12006/06/avatarbased_mar.html, accessed Nov. 10, 2011, 6 pages.
Avatar-Based Marketing: The Avatar-Based Panel (Part Four of Five), New World Notes, http://nwn.blogs.com/nwn/2006/06/avatarbased_mar.html, accessed Nov. 10, 2011, 6 pages.
Avatar-Based Marketing: The Avatar-Based Panel (Part One of Five), New World Notes, http://nwn.blogs.com/nwn/2006/06/avatarbased_mar.html, accessed Nov. 10, 2011, 6 pages.
Hughes, "Those custom Reeboks and the next party," Eightbar, http://eightbar.co.uk/2006/10/11/those-custom-reeboks-and-the-next-party, accessed Oct. 11, 2006, 5 pages.
Hughes, "Planes, trains and automobiles, here come Nissan," Eightbar, http://eightbar.co.uk/2006/10/24/planes-trains-and-automobiles-here-come-nissan, Oct. 24, 2006, 3 pages.
Hughes, "The Sony BMG media island, it is very good," Eightbar, http://eightbar.co.uk/2006/10/19/the-sony-bmg-media-island-it-is-very-good, Oct. 19, 2006, 8 pages.
Hughes, "Ben Folds in Second Life the Event," Eightbar, http://eightbar.co.uk/2006/10/20/ben-folds-in-second-life-the-event, Oct. 20, 2006, 3 pages.
Reynolds, "Virtual Worlds introduction presentation," Eightbar, http://eightbar.co.uk/2006/08/17/virtual-worlds-introduction-presentation, Aug. 17, 2006, 8 pages.
"Life2Life—ECS-Powered Amazon Store Within Second Life," Amazon Web Services Blog, http://aws.typepad.com/aws/2006/07/lifetolife_ecspo.html, accessed Nov. 10, 2011, 7 pages.
"Trap," NWN Wikia, http://web archive.org/web/20071112084836/http://nwn.wikia.com/wiki/Trap, accessed Sep. 14, 2011, 3 pages.
"Unseen," WOW Wiki, http://web.archive.org/web/20070207113119/http://www.wowwiki.com/Unseen, accessed Sep. 14, 2011, 2 pages.
USPTO Office Action regarding U.S. Appl. No. 11/846,724, dated Oct. 27, 2010.
USPTO Final Office Action regarding U.S. Appl. No. 11/846,724, dated Feb. 4, 2011.
USPTO Office Action regarding U.S. Appl. No. 12/108,925, dated Sep. 9, 2011.
USPTO Office Action regarding U.S. Appl. No. 12/108,968, dated Oct. 28, 2011.
USPTO Supplemental Notice of Allowance regarding U.S. Appl. No. 12/109,023, dated May 13, 2011.
USPTO Final Office Action regarding U.S. Appl. No. 12/168,657, dated Oct. 4, 2011.
Office Action, dated Dec. 20, 2012, regarding U.S. Appl. No. 11/846,724, 12 pages.
Notice of Allowance, dated Dec. 13, 2012, regarding U.S. Appl. No. 12/168,657, 12 pages.
Office Action, dated Oct. 4, 2012, regarding U.S. Appl. No. 13/531,265, 46 pages.
Notice of allowance dated Feb. 4, 2013 regarding U.S. Appl. No. 13/531,265, 12 pages.
Notice of allowance dated Feb. 22, 2013 regarding U.S. Appl. No. 12/168,657, 13 pages.
Finn et al., "Contextual Templates for Modifying Objects in a Virtual Universe," U.S. Appl. No. 13/531,265, filed Jun. 22, 2012, 48 pages.
Notice of Allowance regarding U.S. Appl. No. 12/109,010, dated Apr. 11, 2012, 15 pages.
Office Action regarding U.S. Appl. No. 12/168,657, dated Jun. 22, 2012, 45 pages.
Finn et al., "Geometric and Texture Modifications of Objects in a Virtual Universe Based on Real World User Characteristics," U.S. Appl. No. 13/917,891, filed Jun. 14, 2013, 67 pages.
Notice of Allowance, dated Feb. 14, 2013, regarding U.S. Appl. No. 12/109,040, 38 pages.
Notice of Allowance, dated Feb. 22, 2013, regarding U.S. Appl. No. 12/168,657, 13 pages.
Notice of Allowance, dated Feb. 4, 2013, regarding U.S. Appl. No. 13/531,265, 12 pages.
Final office action dated Sep. 27, 2013 regarding U.S. Appl. No. 11/846,724, 13 pages.
Notice of allowance dated Jan. 20, 2012, regarding U.S. Appl. No. 12/866,266, 5 pages.
Office action dated Sep. 29, 2011, regarding U.S. Appl. No. 12/866,266, 9 pages.
Office Action, dated Aug. 6, 2014, regarding U.S. Appl. No. 11/846,724, 16 pages.
International Search Report dated Mar. 4, 2009, regarding PCT application No. PCT/JP2009/000512, 4 pages.

* cited by examiner

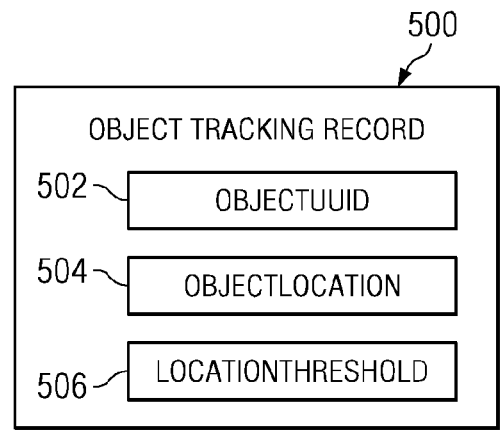

FIG. 5

OBJECT AVATAR
RENDERING (OAR) TABLE
600

602 — RenderingUUID = PRIMARY KEY.

604 — ObjectUUID = FOREIGN KEY TO EXISTING OBJECT TABLE.

606 — AvatarUUID = FOREIGN KEY TO EXISTING AVATAR TABLE.

608 — Zone1EnterTime = UTC DATETIME WHEN AVATAR'S SESSION STARTED (WHEN THEY ENTERED THE FIRST ZONE, ASSUMING A TWO ZONE MODEL).

610 — Zone1LeaveTime = UTC DATETIME WHEN AVATAR LEFT THE FIRST ZONE.

612 — Zone2EnterTime = UTC DATETIME WHEN AVATAR'S SESSION STARTED (WHEN THEY ENTERED THE SECOND ZONE, ASSUMING A TWO THRESHOLD MODEL).

614 — Zone2LeaveTime = UTC DATETIME WHEN AVATAR LEFT THE SECOND ZONE.

616 — NumberOfZone1Enters = NUMERIC COUNTER OF HOW MANY TIMES AVATAR HAS ENTERED THE FIRST ZONE.

618 — NumberOfZone2Enters = NUMERIC COUNTER OF HOW MANY TIMES AVATAR HAS ENTERED THE SECOND ZONE.

620 — LastCoordinates = COORDINATE DATA OF WHERE THE AVATAR IS WITHIN THE ZONES (TYPICALLY AN XYZ SYSTEM).

FIG. 6

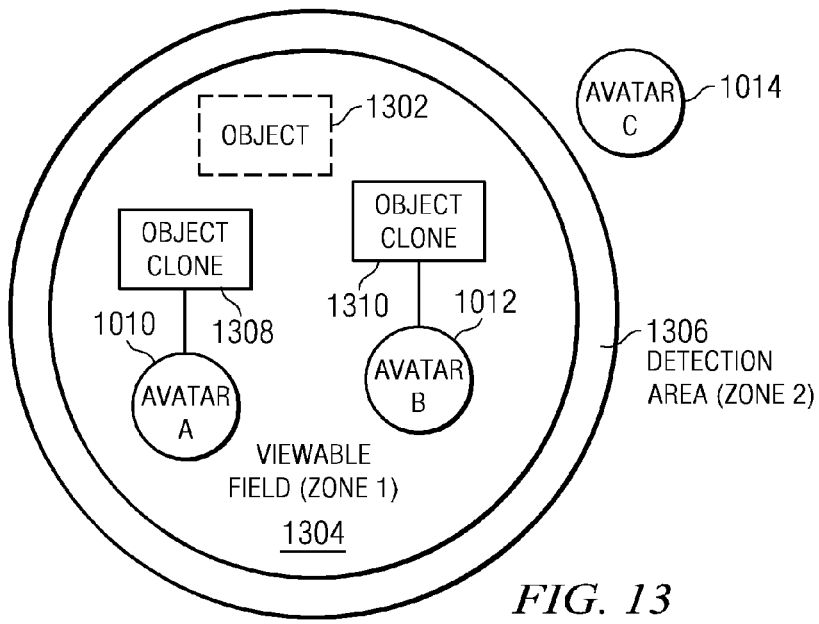

FIG. 13

| RENDERING UUID = PRIMARY KEY | | |
|---|---|---|
| OBJECT A UUID | AVATAR A UUID | 1404 |
| | AVATAR A ZONE 1 ENTER TIME | 1406 |
| | AVATAR A ZONE 2 ENTER TIME | 1408 |
| | AVATAR A ZONE 1 LEAVE TIME | 1410 |
| | AVATAR A ZONE 2 LEAVE TIME | 1412 |
| OBJECT B UUID | AVATAR A UUID | 1422 |
| | AVATAR A ZONE 1 ENTER TIME | 1424 |
| | AVATAR A ZONE 2 ENTER TIME | 1426 |
| | AVATAR A ZONE 1 LEAVE TIME | 1428 |
| | AVATAR A ZONE 2 LEAVE TIME | 1430 |
| | AVATAR C UUID | 1432 |
| | AVATAR C ZONE 1 ENTER TIME | 1434 |
| | AVATAR C ZONE 2 ENTER TIME | 1436 |
| | AVATAR C ZONE 1 LEAVE TIME | 1438 |
| | AVATAR C ZONE 2 LEAVE TIME | 1440 |

OBJECT BASED AVATAR TABLE 1400

FIG. 14

COLOR MODIFICATIONS OF OBJECTS IN A VIRTUAL UNIVERSE BASED ON USER DISPLAY SETTINGS

BACKGROUND OF THE INVENTION

1. Field of the Invention

The present invention is related generally to a data processing system and in particular to a method and apparatus for managing objects in a virtual universe. More particularly, the present invention is directed to a computer implemented method, apparatus, and computer usable program code for modifying a virtual universe object color based upon user display settings.

2. Description of the Related Art

A virtual universe (VU) is a computer-based simulated environment. A virtual universe is also referred to as a metaverse or "3D Internet." Examples of virtual universes include Second Life®, Entropia Universe, The Sims Online®, There.com, and Red Light Center. Other examples of virtual universes include multiplayer online games, such as EverQuest®, Ultima Online®, Lineage®, and World of Warcraft® (WoW).

Many virtual universes are represented using three dimensional (3-D) graphics and landscapes. The properties and elements of the virtual universe often resemble the properties of the real world, such as in terms of physics, houses, and landscapes. Virtual universes may be populated by thousands of users simultaneously. In a virtual universe, users are sometimes referred to as "residents."

The users in a virtual universe can interact, inhabit, and traverse the virtual universe through the use of avatars. An avatar is a graphical representation of a user that other users in the virtual universe can see and interact with. The avatar's appearance is typically selected by the user and often takes the form of a cartoon-like representation of a human. However, avatars may also have non-human appearances, such as animals, elves, trolls, orcs, fairies, and other fantasy creatures.

The viewable field is the field of view for a particular user. The viewable field for a particular user may include objects, as well as avatars belonging to other users. The viewable field is determined by the virtual universe grid software according to the geometries and textures that are currently loaded in a user's virtual universe client. The virtual universe grid determines the length of time that a user views an object based on processing the data sent to each virtual universe client.

Objects are prevalent in virtual universes. An object is an element in a virtual universe that does not represent a user. An object may be, for example, buildings, statues, billboards, signs, and advertisements in the virtual universe. However, objects viewed by users traversing a virtual universe may be difficult or impossible to view because of the manner in which the object is presented to a user. For example, the display settings of a user's display device may be set in a suboptimal manner. For example, user settings of a display device may cause an image object to be presented as overly bright or alternatively, too dim. Furthermore, user-selected color settings of the display device may cause an object to be rendered in such a way to make viewing difficult or in a manner inconsistent with the object owner's intended depiction.

BRIEF SUMMARY OF THE INVENTION

In one embodiment, the process obtains avatar tracking data that identifies a location of an avatar in relation to a range of an object. The range includes a viewable field. In one embodiment, the process obtains avatar tracking data that identifies a location of an avatar in relation to a range of an object. The range includes a viewable field. The process then selects a data collection method based on the location of the set of avatars. In response to detecting an event for triggering modification of the object, the process calculates a set of color modifiers based on display setting data to form a modified color. Thereafter, the process renders the object using the modified color when the location of the set of avatars is within the range of the object.

BRIEF DESCRIPTION OF THE SEVERAL VIEWS OF THE DRAWINGS

FIG. 5 is a block diagram of a record stored in an object tracking table in accordance with an illustrative embodiment;

FIG. 6 is a block diagram of an object avatar rendering table in accordance with an illustrative embodiment;

FIG. 13 is a block diagram of a set of clones presented to a set of avatars in accordance with an illustrative embodiment;

FIG. 14 is a block diagram of an object based avatar table for a plurality of objects in accordance with an illustrative embodiment;

DETAILED DESCRIPTION OF THE PREFERRED EMBODIMENT

Figure 1:
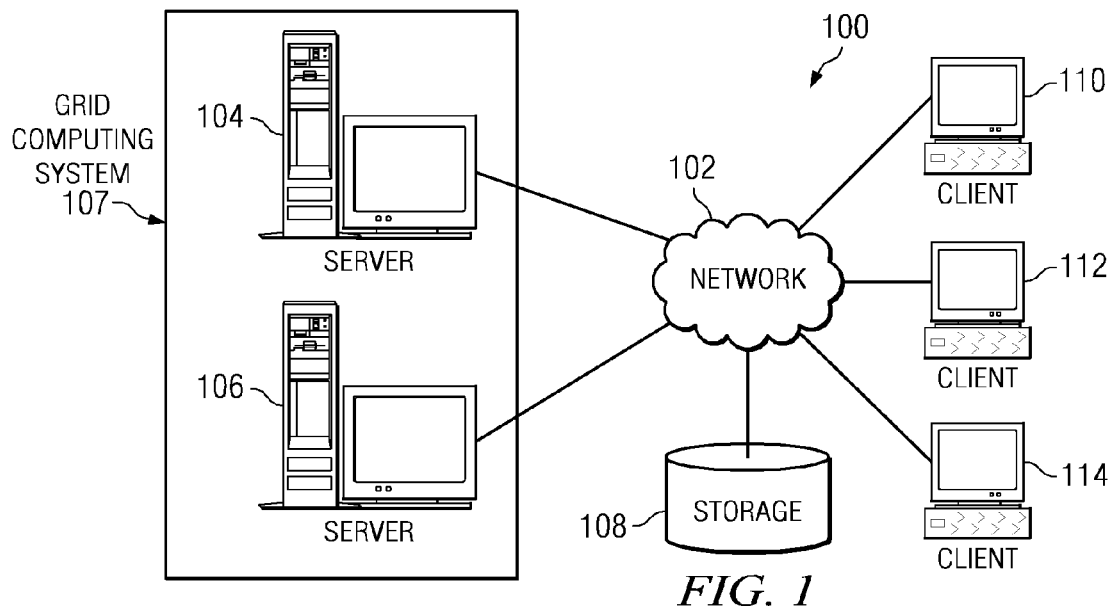
FIG. 1 is a pictorial representation of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable data storage medium(s) may be utilized. The computer-usable or computer-readable data storage medium may be, for example but not limited to, an electronic, magnetic, optical, or semiconductor system, apparatus, or device. More specific examples (a non-exhaustive list) of the computer-readable data storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable data storage medium may be any medium that can store, the program for use by or in connection with the instruction execution system, apparatus, or device. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language, such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable data storage medium that can direct a computer or other programmable data processing apparatus to function in a particular manner, such that the instructions stored in the computer-readable data storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
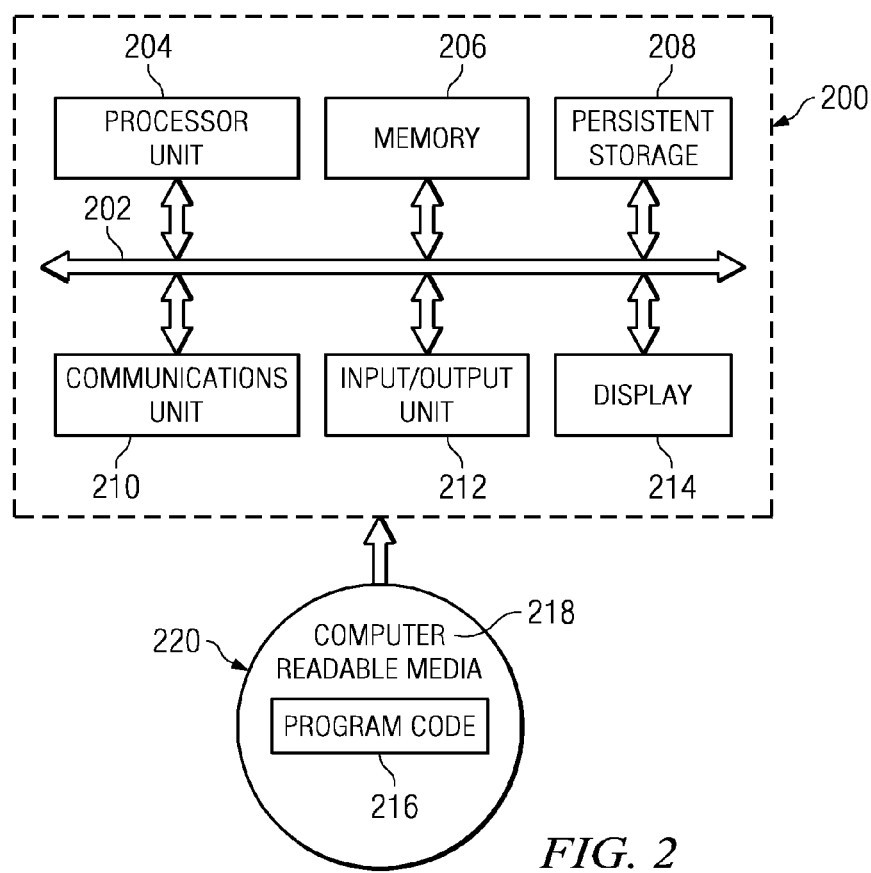
FIG. 2 is a block diagram of a data processing system in accordance with an illustrative embodiment of the present invention.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. Servers 104 and 106 are servers associated with a virtual universe. In particular, servers 104 and 106 form grid computing system 107. Grid computing system 107 is a system formed from two or more data processing systems for rendering and managing a virtual universe. Users of the virtual universe have agents on servers 104 and 106. An agent is a user's account. A user uses an agent to build an avatar representing the user. The agent is tied to the inventory of assets or possessions the user owns in the virtual universe.

Clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. A server, such as server 104 may store a region of a virtual universe. A region is a virtual area of land within the virtual universe. In a virtual universe, assets, avatars, the environment, and anything visual consists of universally unique identifiers (UUIDs) tied to geometric data, textures, and effects data. Geometric data is distributed to a user's client computer, such as client 110, as textual coordinates. Textures are distributed to a user's client computer as graphics files, such as Joint Photographic Experts Group (JPEG) files. Effects data is typically rendered by the user's client according to the user's preferences and the user's client device capabilities.

In the depicted example, network data processing system 100 is the Internet with network 102 representing a world-wide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments. Network data processing system 100 may include additional servers, clients, and other devices not shown.

Turning now to FIG. 2, a block diagram of a data processing system is depicted in accordance with an illustrative embodiment of the present invention. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub that may be present in communications fabric 202.

A virtual universe is a computer-simulated environment, such as, without limitation, Second Life®, Entropia Universe, The Sims Online®, There.com, Red Light Center, EverQuest®, Ultima Online®, Lineage®, and World of Warcraft®. A virtual universe is typically represented using three-dimensional (3-D) graphics to represent various objects, such as landscapes, the sky, animals, vehicles, buildings, and other graphical objects.

The users in the virtual universe interact, inhabit, and traverse the virtual universe using avatars. Avatars represent users and are controlled or associated with users. A user can view objects and other avatars within a given proximity of the user's avatar. The virtual universe grid software determines which objects and other avatars are within the given proximity of the user's avatar according to the geometries and textures that are currently loaded in the user's virtual universe client.

The manner in which an object is rendered may affect the visibility of the object. In particular, an object's coloring may affect a user's ability to see or recognize the object. For example, an object in a virtual universe may be a soda can displaying a company's trademark red and white colors. Object methods may be applied to the soda can to modify the rendering of the can based upon ambient conditions in the virtual universe. Thus, if the soda can were viewed by a user in a low light environment, the trademarked red and white soda may be rendered in a maroon and gray color scheme. Not only is the can less visible because the can is rendered in less vibrant colors, but the user may not immediately recognize the trademark owner because the colors have been modified. Similarly, if the soda can were viewed under a light source in the virtual universe environment, then glare from the light source may prevent a user from discerning the object, its trademarked colors, or any other information that may be presented on the soda can.

The visibility of an object in a virtual universe also depends on a user's display settings. Display settings are properties that a user may change by modifying a video controller of a client computer or settings on a display device. The display device may be, for example, a monitor. User display settings include settings, such as saturation, brightness, contrast, and hue. User display settings may affect the visibility of an object. For example, hue settings of a display device may be selected that prevent the soda can from being perceived by the user as having the trademarked red and white markings. Instead, the hue settings may make the soda can appear a magenta-like color. Users that view such a can may not immediately recognize the soda can's trademarked colors and thus may not associate the can with the trademark owner. However, modification of an object's coloring in the virtual universe may offset user display settings that may decrease the visibility of the objects. Therefore, the object's visibility may be increased.

Therefore, the illustrative embodiments recognize that object coloring may need to be altered in a manner to make the object more visible to users controlling avatars in a virtual universe. In particular, object coloring in a virtual universe may need to be altered to offset user display settings that make an object less visible. User display settings may be converted into RGB values. RGB values are sets of numerical values between 0 and 255 that are mixed to form all other colors in a virtual universe. RGB values, also referred to herein as primary color values, represent the amount of red, green, and blue present in a selected color. For example, red has an RGB value of 255, 0, 0. Green has an RGB value of 0, 255, 0. Blue has an RGB value of 0, 0, 255. White has an RGB value of 0, 0, 0. Black has an RGB value of 255, 255, 255. All other colors have unique combinations of red, green, and blue values. The values may be represented by their hexadecimal, binary, or other equivalent formats.

Saturation may be converted to RGB values by processing display setting data with a mathematical equation. For example, a saturation formula sometimes used to convert saturation into an RGB value is:

$$\frac{\max r, g, b - \min r, g, b}{\mu},$$

where $\mu$ is the brightness defined as the mean of red, green, and blue.

Similarly, contrast may be converted to RGB values by processing display setting data with a different mathematical equation. One equation that is sometimes used is:

$$\frac{I_{MAX} - I_{MIN}}{I_{MAX} + I_{MIN}},$$

where $I_{MAX}$ and $I_{MIN}$ represent the highest luminance and lowest luminance, respectively.

Brightness may be converted to RGB values by processing display setting data by calculating the mean using the following formula:

$$\frac{R + G + B}{3}$$

Hue may be converted to RGB color values by processing display setting data with yet another mathematical equation. The equation sometimes used is:

$$\frac{\sqrt{3} \cdot (G - B)}{2 \cdot R - G - B} = \tanh_{Preucil\ hexagon}$$

Although only one equation for each type of user display setting has been presented for converting user display setting data into RGB values, many equations exist and may be used instead. Once user display settings are converted into RGB values, an object color may be modified in a virtual universe environment to offset user display settings that may make less visible objects in the virtual universe more visible.

According to one embodiment of the present invention, object avatar tracking data is obtained which identifies a location of an avatar in relation to a range of an object. A range is a distance from an object. The range may be predefined and subdivided into two or more regions. For example, a range may be divided into a viewable field and a detection zone. Object methods may be invoked and applied to an object based upon an avatar's location within the range of the object. The object methods may modify the color of the object and/or visual elements presented on the object.

An avatar's location is determined from avatar tracking data. Avatar tracking data is obtained from at least one of an object avatar rendering table and an object based avatar tracking controller. In other words, the tracking data for the avatar may be obtained from either object avatar rendering table, the object based avatar tracking controller, or both. However, in other embodiments, the avatar tracking data may be obtained from any other source.

The process then selects a data collection method based on the location of the set of avatars. As used herein, the term "set" refers to one or more. Thus, a set of avatars means one or more avatars. Once selected, the process determines a modified color based on user display settings to form a modified color in response to detecting an event for triggering modification of the object. Thereafter, the process renders an object using the modified color when the location of the set of avatars is within the range of the object.

Figure 3:
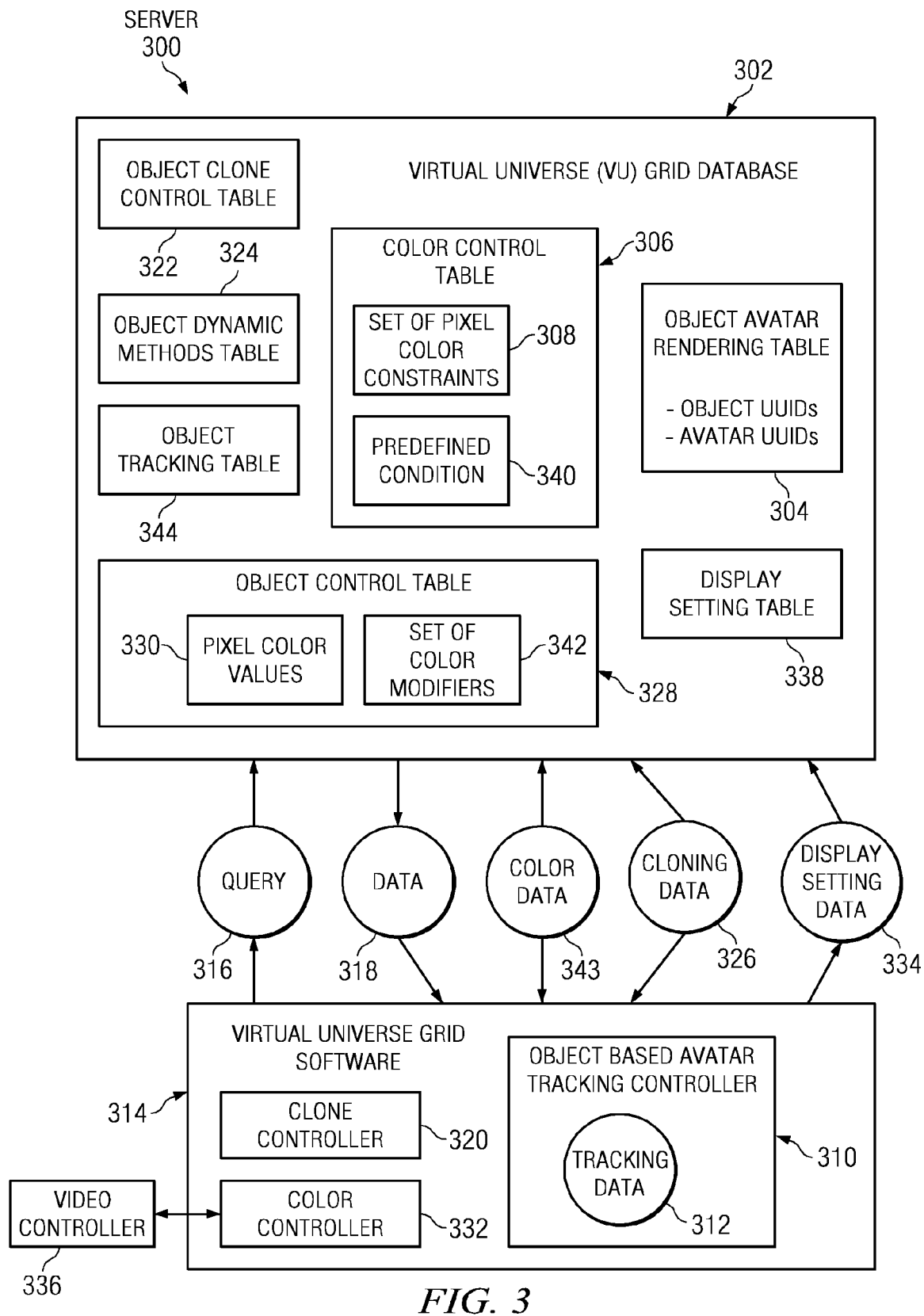
FIG. 3 is a block diagram illustrating a virtual universe grid server in accordance with an illustrative embodiment.

FIG. 3 is a block diagram illustrating a virtual universe grid server in accordance with an illustrative embodiment. Server 300 is a server, such as server 104 in FIG. 1. Server 300 may host a virtual universe region. Server 300 may be a single, stand-alone server, or server 300 may be a server in a virtual universe grid computing system or in a cluster of two or more servers. In this example, server 300 is a server in a grid computing system, such as grid computing system 107 in FIG. 1, for rendering and managing a virtual universe.

In a virtual universe, assets, avatars, the environment, and other objects are correlated with universally unique identifiers (UUIDs) tied to geometric data, textures, and effects data. Geometric data is data associated with the form or shape of avatars and objects in the virtual universe. Geometric data may be used to construct a wire frame type model of an avatar or object. Geometric data is distributed to a user's client computer as textual coordinates. Textures are distributed to a user's client computer as graphics files, such as JPEG files. Texture data refers to the surface detail and surface textures or color that is applied to wire-frame type geometric data to render avatars or other objects in the virtual universe. Effects data is typically rendered by the user's client according to the user's preferences and the user's client device capabilities.

Virtual universe grid database 302 is a database on the grid computing system for storing data associated with a virtual universe. This data includes, without limitation, the universally unique identifiers and the associated geometric data, textures, and effects data. This data may be stored in one or more tables within virtual universe grid database 302. For example, virtual universe grid database 302 includes object avatar rendering (OAR) table 304. Object avatar rendering table 304 is a table that stores universally unique identifiers for objects and avatars and other data describing avatars within a viewable field of the object or within a selected zone associated with the object. For example, if the selected objects include object A and object B, then object avatar rendering table 304 stores a universally unique identifier for object A, universally unique identifiers and other data for all avatars within the viewable field of object A, universally unique identifiers for object B, and universally unique identifiers and other data for all avatars within the viewable field of object B.

In this illustrative example in FIG. 3, virtual universe grid database 302 also includes color control table 306. Color control table 306 is a data structure that includes set of pixel color constraints 308. Set of pixel color constraints 308 is one or more rules or limitations that provide a range of color modifications that may be performed on an object in a virtual universe. Set of pixel color constraints 308 may specify an acceptable upper and lower RGB values that may be applied to an object. Set of pixel color constraints 308 are discussed in more detail with respect to FIG. 4.

For example, an object in a virtual universe may be a soda can displaying a company's trademark red and white colors. Set of pixel color constraints 308 may control the range of colors with which the object and/or the trademarked colors are rendered and presented to an avatar in a virtual universe. Thus, the soda can's red and white colors may be maintained within a range of shades of red white that permits a user encountering the soda can to quickly and easily associate the trademarked colors and design with the trademark owner. In addition, set of pixel color constraints 308 may also be used to prevent situations, such as when calculated RGB values exceed the range of permissible values. For example, a color may have RGB values between the permissible range of 0 to 255. If an object's color is modified according to a mathematical equation that results in an RGB value outside the range of 0 to 255, set of pixel color constraints 308 may specify the upper limit of 255 and the lower limit of 0.

Objects in a virtual universe may be modified by object methods based upon the location of a set of avatars in relation to a range of the object. An object method is a method that may be invoked on an object. Object methods may be invoked to modify the rendering of an object or clone, thereby altering the object's or clone's color. Object method may also be used to modify the object's size. In one embodiment, the invocation of object methods depends upon a location of a set of avatars in relation to the range of an object. Thus, if an avatar is within the range of an object, then object methods may be invoked by a software controller to modify the object. The location of the set of avatars in relation to the range of one or more objects may be determined by object based avatar tracking controller 310.

Object based avatar tracking controller 310 is a software program that collects and maintains tracking data 312. Tracking data 312 is data describing, without limitation, the location of an avatar in a virtual universe in relation to an object. For example, tracking data 312 may describe virtual universe coordinates that indicate that an avatar is within the range of an object. In addition, tracking data 312 may also include the universally unique identifiers and other data describing avatars within the viewable field of the selected objects.

Object based avatar tracking controller 310 may store tracking data 312 in object avatar rendering table 304. In addition, object based avatar tracking controller 310 may make tracking data 312 immediately available to other software controllers in virtual universe grid software 314. Data stored in object avatar rendering table 304, or any other data structure stored in virtual universe grid database 302 may be accessed by a software controller in virtual universe grid software 314 by submitting query 316. In response to query 316, virtual universe grid database 302 sends data 318 to the requesting software controller. Data 318 is any data stored in virtual universe grid database 302, including tracking data 312. Data 318 may also include data associating with object rendering and existence of clones in a virtual universe. Data 318 may use software controllers for tracking avatars and, in some embodiments, implement modifications of the selected objects to improve the position and appearance of the selected objects within the virtual universe and enable improved visibility of the selected objects.

In one embodiment, an object in a virtual universe is modified in relation to all avatars within the range of the object. Thus, if two or more avatars are in the range of the same object, the object may be modified by an appropriate software controller for rendering the object in a manner that accommodates the circumstances of each avatar. For example, if a first avatar in the range of the object is wearing sunglasses and a second avatar is not, then the object's color may be modified to accommodate both avatars. In particular, the object's color may be altered in a manner to make the object both more visible to the first and second avatar.

In an alternate embodiment, each avatar in the range of the object is presented with a clone of the object. An object in a virtual universe may be cloned so that each avatar that encounters the object is presented with its own instance of the object. Consequently, each instance of the object may be modified in a manner that is optimal for each avatar that encounters the object. Thus, the first avatar wearing sunglasses would be presented with a clone of the object to make the object more viewable to the avatar wearing sunglasses. Similarly, the second avatar may be presented with a clone of the object to remove glare. If each avatar is presented with an instance of the object, then different object methods may be applied to each object instance depending upon the unique circumstances of each avatar. Clones in a virtual universe may be maintained by clone controller 320. Clone controller 320 is software for generating clones of objects within a virtual universe. Clone controller 320 may generate a clone of an object for each avatar in a particular range of an object. A range of an object is an area proximate to an object and may include one or more sub regions. For example, a range of an object includes a viewable field and a detection area, as is depicted in regard to object 902 in FIG. 9. In addition, clone controller 320 selects and invokes the object methods for modifying the clones in the virtual universe.

Virtual universe grid software 314 hosts clone controller 320. Virtual universe grid software 314 is a client-side application that exchanges data with virtual universe grid database 302 for rendering and managing the virtual universe. In addition, virtual universe grid software 314 may host other software controllers, such as controllers for controlling a color of an object or clone, and for tracking objects in a virtual universe.

Object clone control table 322 is utilized by clone controller 320 to facilitate cloning in a virtual universe. Object clone control table 322 is a data structure storing, among other things, universally unique identifiers for objects, avatars, and instances. Universally unique identifiers for instances are universally unique identifiers assigned to each clone that is created in a virtual environment. Universally unique identifiers for instances allow methods to identify and maintain the various clones that exist in a virtual universe.

The object methods that may be applied to each clone is stored in object dynamic methods table 324. Object dynamic methods table 324 is a data structure storing the object methods that may be applied to objects or clones identified in object clone control table 322. In addition, object dynamic methods table 324 may associate each object method stored therein with priority logic. The priority logic may be used for selecting an order in which methods may be executed in the event that an object or clone is subject to modification by more than one object method.

Tracking data 312 may be obtained by clone controller 320 for generating clones of objects. In this example, clone controller 320 obtains tracking data 312 from object based avatar tracking controller 310 as tracking data 312 is generated. However, in an alternate embodiment, clone controller 320 may obtain tracking data 312 from object avatar rendering table 304. In yet another embodiment, clone controller 320 may obtain tracking data 312 from any other source.

The clones may then be presented to a set of avatars in a range of the object. Clone controller 320 may generate a clone of an object for each avatar in a particular range of an object. A range of an object is an area proximate to an object and may include one or more sub areas. For example, a range of an object includes a viewable field and a detection area, as is depicted in regard to object 902 in FIG. 9.

Clone controller 320 initiates the process of generating clones when the location of an avatar is within a range of an object. Clone controller 320 may determine that the avatar's location is in the range of an object by obtaining tracking data 312. Tracking data 312 is data that identifies a location of an avatar in relation to a range of an object. In this example, clone controller 320 obtains tracking data 312 from object based avatar tracking controller 310 as tracking data 312 is generated. However, in an alternate embodiment, clone controller 320 may obtain tracking data 312 from object avatar rendering table 304. In yet another embodiment, clone controller 320 may obtain tracking data 312 from any other source.

Each clone that is generated may be rendered according to a different object method. For example, an object method may illuminate a portion of the object, enhance the size of an object, change the color of an object, or remove the effect of another method that otherwise obscures the object. For clone controller 320 to keep track of the various clones and object methods, clone controller 320 stores cloning data 326 into object clone control table 322. Cloning data 326 is data that includes the universally unique identifiers of objects, avatars, and clones. Clone controller 320 may also reference cloning data 326 stored in object clone control table 322 for identifying and invoking a set of object methods that may be rendered with respect to each clone.

The clones may be used to improve the visibility of the object from which the clone was derived. In one embodiment, improved visibility may be achieved by cloning the object so that each cloned object may be modified in a selected manner. In this manner, each avatar that encounters an object may be presented with an object modified in a manner deemed optimized by one or more predefined rules. For example, two avatars may approach the same object from a different location. If each location is a different distance from the object, then each avatar may be presented with a clone of the object having a color that facilitates viewing of the object by a particular avatar.

Objects in a virtual universe are rendered in colors that may be specified by data stored in object color table 328. Object color table 328 is a data structure storing pixel color values 330. Pixel color values 330 is data describing an object's colors. Pixel color values 330 may be numerical values between 0 and 255 corresponding to the range of values used in an RGB scale. The data stored in pixel color values 330 may describe the color of individual pixels or a group of pixels of an object.

Modification of object colors is performed by color controller 332. Color controller 332 is a software program for controlling the color of an object in a virtual universe. In particular, color controller 332 is capable of modifying the color of an object based upon object methods invoked on the object. In addition, color controller 332 may modify the color of an object based on display setting data 334. Display setting data 334 is data derived from the display settings of video controller 336. Video controller 336 is a component of a client's computer controlling display settings. Video controller 336 may be a hardware component, software component, or a combination of hardware and software. For example, the Microsoft Windows™ platform implements the CIM_Video-BIOSElement class for configuring and querying video controller and display settings. In addition, display manufacturers may also implement other interfaces for querying display settings. Display settings include, for example, saturation, brightness, contrast, and hue. Display setting data 334 may take any form of data, including RGB values. The RGB values may be converted from display settings of the video controller using any available conversion algorithm, such as the algorithms discussed above.

Color controller 332 may generate display setting data 334 from the display settings of video controller 336. Once generated, color controller 332 may store display setting data 334 in display setting table 338. Display setting table 338 is a data structure storing display setting data 334. Color controller 332 may reference display setting data 334 to determine whether an object's color should be modified based upon a user's display settings. For example, color controller 332 may modify the object's color when there is a delta display setting. The delta display setting is a difference between the optimal display settings and a user's selected display settings. In one embodiment, delta display settings may be identified by comparing RGB values of the user's selected display settings with RGB values corresponding to a display device's or video controller's optimal display settings. If a delta value exists, then color controller 332 may calculate set of color modifiers 342 to form a modified color of the object. Set of color modifiers 342 is one or more modifiers that may be applied to pixel color values 330 to offset the effects of a user's display settings. Set of color modifiers 342 may include, for example, a modifier to modify an object's brightness, saturation, hue, or an object's primary colors.

Once a modified color of the object is formed, the object may then be rendered using the modified color so that a user viewing the object perceives the object as though the object is rendered according to the optimal display settings for the object. For example, a user's display settings may be set to a low contrast level. Consequently, color controller 332 may detect the low contrast level as predefined condition 340. As a result, color controller 332 may calculate set of color modifiers 342 to change the RGB values of the object to increase the contrast of a set of objects in the avatar's view. The RGB values may be increased until the contrast is within an acceptable range of RGB values as set forth in set of pixel color constraints 308. Similarly, color controller 332 may change the RGB values of the set of objects based on the brightness, hue, and saturation of a user's selected display settings.

Calculation of set of color modifiers 342 may be accomplished using any currently known, or later developed, algorithm for making an object's perceived primary color values comport with stored primary color values in pixel color values 330. In one embodiment, set of color modifiers 342 may be calculated as the inverse of the delta primary color values. The delta primary color values may be determined by comparing an object's primary color values stored in pixel color values 330 to the object's perceived primary color values. Color controller 332 may then generate set of color modifiers 342 that may be applied to the object to offset the user's selected display settings. Thus, for example, consider a virtual universe object that is decorated with a logo having stored primary color values of 0, 100, 0. If a user's selected display settings make the logo appear to the user as having primary color values of 0, 130, 0, then the delta primary color values are 0, +30, 0. In this example, set of color modifiers 342 is the inverse of the delta primary color values, which is 0, −30, and 0. When the logo is rendered using set of color modifiers 342, the logo has an actual color corresponding to primary color values of 0, 70, 0. However, when the logo is viewed by a user subject to the user's selected display settings, the logo appears to have primary color values of 0, 100, 0. In this manner, the user's selected display settings are offset by set of color modifiers 342.

Color controller 332 may calculate set of color modifiers 342 for modifying a color of an object if there is a delta display setting that exceeds a predefined threshold. Thus, color controller 332 may refrain from calculating set of color modifications 342 for an object despite the fact that a delta display setting exists. However, if the delta display setting exceeds the predefined threshold, then color controller 332 may calculate set of color modifications 342 for modifying the object's coloring. This threshold may be stored as predefined condition 340. Predefined condition 340 is one or more types of events or conditions that may be stored in color control table 306. In one example, predefined condition 340 may be a threshold that initiates modification of an object's color. In particular, when color controller 332 detects predefined condition 340, color controller may calculate set of color modifiers 342 for implementing object color modification.

Predefined condition 340 may also indicate whether color modifications should be restricted. For example, predefined condition 340 may specify a threshold value of permissible color modifications. The threshold value may be, for example, a delta RGB value, a delta display setting, or simply a RGB value. The delta display setting may be, for example, a delta saturation level, brightness level, contrast level, or hue level. Consequently, if color controller 332 detects that a delta value calculated from pixel color values 330 and proposed RGB values derived from object color modification exceeds predefined condition 340, then color controller 332 may reference set of pixel color constraints 308 to restrict the color modification.

Color controller 332 may use color data 343 to determine whether predefined condition 340 has been satisfied. Color data 343 may originate from tables within virtual universe grid database 302. For example, color data 343 may originate from color control table 306, or from object color table 328. Color data 343 may include an RGB value for the pixels of an object. In addition, color data 343 may include an RGB value for the effects applied to a pixel. The effects applied to the pixel may include, for example, a color change for presenting shadows, smoke, flames, lighting, or other effects. The RGB values for the effects applied to the pixel may be determined by querying a virtual universe client's effects settings to identify the effects being applied. Consequently, the resultant delta RGB value for a pixel may be calculated. Once calculated, color controller 332 may then determine whether the pixel's color should be modified based upon set of pixel color constraints 308.

New methods for collecting display setting data 334 may be selected when color controller 332 detects predefined condition 340. Predefined condition 340 is a condition stored in color control table 306. For example, predefined condition 340 may be the addition or removal of an object from a virtual universe region. If the number of objects in the virtual universe region surpasses a threshold or falls below a threshold number, then color controller 332 may select a new data collection method. In addition, predefined condition 340 may be a range of acceptable RGB values or display settings. Thus, if a user's display settings exceed the acceptable range, then color controller 332 may be triggered to select a new method for collecting display setting data 334. The number of objects in the virtual universe region may be stored and updated in object tracking table 336.

Object tracking table 336 is a data structure storing data that may be used to track objects in a virtual universe region. The number of objects in a virtual universe region may be used for selecting a method for collecting display setting data 334. For example, methods for collecting user display settings may be based upon the number of objects in a virtual universe region. Thus, object tracking table 336 may store records for identifying the objects in the virtual universe region, in addition to one or more threshold values. As the number of objects surpasses or falls below a threshold value, collection methods may be altered.

Figure 4:
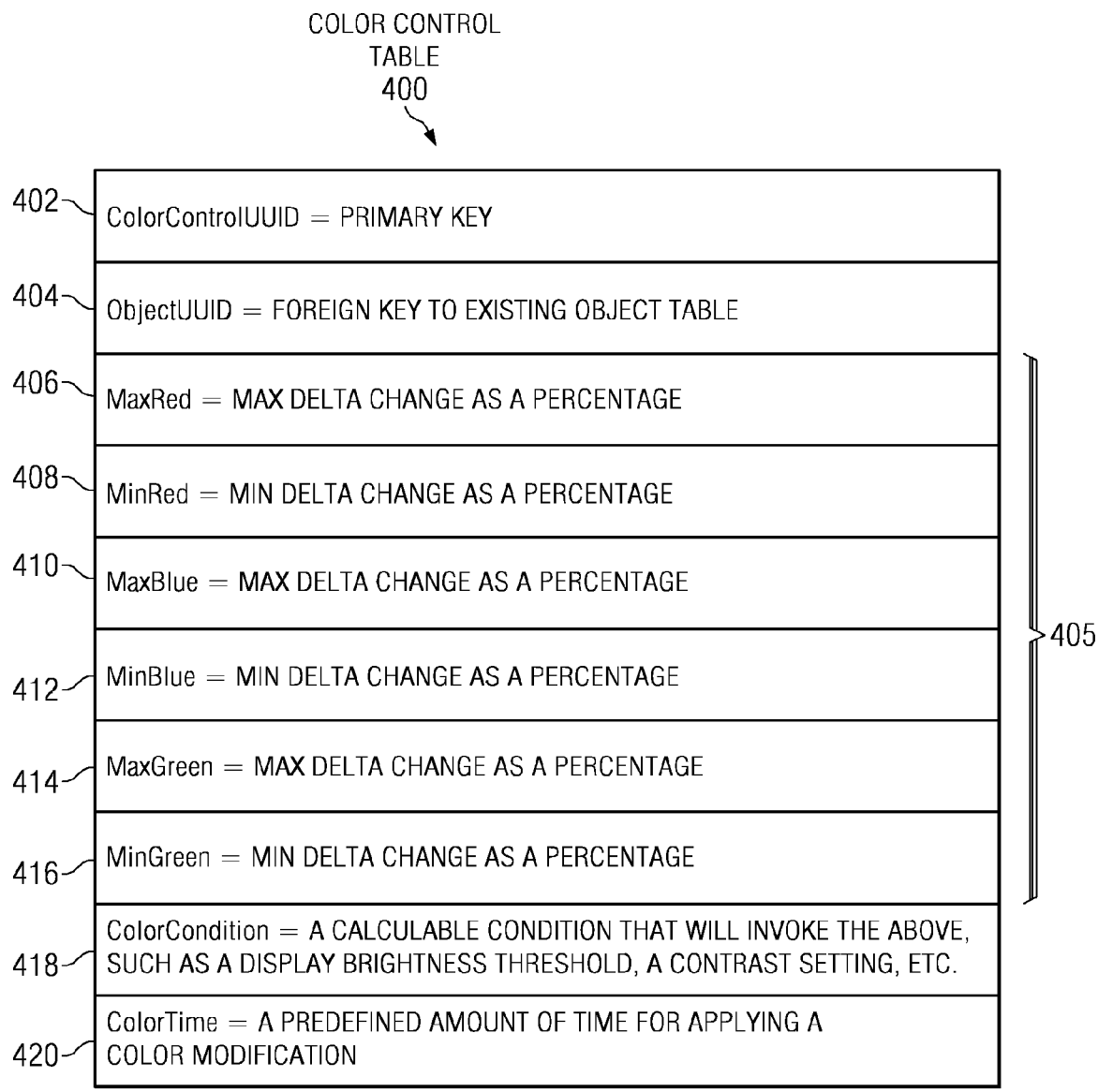
FIG. 4 is a diagram of a color control table in accordance with an illustrative embodiment.

FIG. 4 is a diagram of a color control table in accordance with an illustrative embodiment. Color control table 400 is a color control table, such as color control table 306 in FIG. 3. Color control table 400 includes unique records for the geometries and textures that form the various objects of a virtual universe. Each record may include, without limitation, the sample data fields presented in color control table 400.

ColorControlUUID 402 is a primary key field for color control table 400. ColorControlUUID 402 differentiates the unique entries in color control table 400. A single object may be associated with more than one entry in color control table 400. An object has more than one entry in color control table 400 if the object has more than one type of geometry or texture. ObjectUUID 404 is a foreign key field to an existing object table storing data identifying the objects found in a virtual universe and the methods that may be applied to each object.

Color control table 400 includes set of pixel color constraints 405. Set of pixel color constraints 405 is a range of maximum and minimum allowable RGB values that may be applied to pixels of an object. Set of pixel color constraints 405 includes MaxRed 406. MaxRed 406 is a field that stores a value for a maximum allowable value for red. Similarly, MaxBlue 410 and MaxGreen 414 are fields that store values for maximum values for blue and green, respectively. Similarly, MinRed 408, MinBlue 412, and MinGreen 416 store the minimum allowable values for red, blue, and green, respectively.

In one embodiment, the maximum and/or minimum values may be defined in terms of a maximum allowable percent of change. For example, an RGB value may be modified from an original color by at most 10 percent. Thus, for a particular pixel associated with a given ColorControlUUID, the value stored in MaxRed 406, MaxBlue 410, and MaxGreen 414 is 10. As such, the maximum allowable percent of change for the pixel associated with a given ColorControlUUID is 10 percent. In other words, if a pixel has an RGB value of 100, 100, 100, the maximum allowable RGB value for this color would be 110, 110, 110. The RGB values of 110, 110, 110 are values that are 10 percent larger than the original RGB values of 100, 100, 100.

In another embodiment, set of pixel color constraints 405 may identify the upper and lower permissible RGB values. For example, a pixel associated with a given ColorControlUUID may have a MaxRed 406 value of 115, a MaxBlue value of 110, and a MaxGreen 414 value of 112. The pixel may have an unmodified RGB value of 110, 110, and 110. If a method is invoked to modify the RGB value of the pixel to increase the RGB values, the pixel may be modified only until the maximum RGB values specified in set of pixel color constraints 405 is attained. Thus, the pixel may be modified to include RGB values up to and including a red value of 115, a blue value of 110, and a green value of 112.

The individual RGB values set forth in set of pixel color constraints 405 may be hard coded into color control table 400. Alternatively, the RGB values in set of pixel color constraints 405 may be specified by defining a relationship or equation for hue, saturation, and brightness and applying those equations to the original RGB values of the pixel. For example, a brightness of a color may be increased by increasing the red, green, and blue values equally. A 10 percent increase in brightness may correlate with a 10 percent increase in each of the red, blue, and green values. Thus, the values of set of pixel color constraints 405 may be defined by specifying the allowable change in brightness of a color. Set of pixel color constraints 405 may also be defined with respect to any other color properties, such as hue, contrast, or saturation.

ColorCondition 418 is a field storing a calculable value that may be used to determine whether a color controller, such as color controller 332 in FIG. 3, should modify a color of an object, or one or more pixels of the object, within a virtual universe. The value stored in ColorCondition 418 may be, for example, a threshold contrast, hue, saturation, or brightness. Thus, if a color controller detects that a threshold value stored in ColorCondition 418 has been exceeded, then the color controller may initiate a color modification method. In addition, the value stored in ColorCondition 418 may be a permissible delta for RGB values. Another example of the value stored in ColorCondition 418 may be a time of the day in a virtual universe. The value of ColorCondition 418 may trigger the modification of a color of an object or one or more pixels of the object.

ColorTime 420 is a field storing a value specifying a predefined period of time for which an object's color is modified. Thus, for example, an object that is made brighter to enable one or more avatars to view the object more easily may be made brighter for the time period specified in ColorTime 420. Consequently, a dark environment in a virtual universe will not be overly populated with brightly rendered objects.

FIG. 5 is a block diagram of a record stored in an object tracking table in accordance with an illustrative embodiment. Object tracking record 500 is a record stored in an object tracking table, such as object tracking table 344 in FIG. 3.

Object tracking record 500 is record that may be stored in an object tracking table. Data stored in object tracking record 500 may be used by a color controller, such as color controller 332 in FIG. 3 for selecting a method for collecting user display setting data. In this example, object tracking record 500 includes ObjectUUID 502. ObjectUUID 502 is a field of a record storing a universally unique identifier assigned to an object in a virtual universe. ObjectUUID 502 may serve as a primary key in the object tracking table. Object tracking record 500 associates ObjectUUID 502 with ObjectLocation 504.

ObjectLocation 504 is a field storing an identifier that may be referenced to determine the location or region in which the associated object is found. ObjectLocation 504 may store the name of a region of a virtual universe, coordinates delineating a discrete region of a virtual universe, or any other form of identifier that may be used to distinguish or identify different regions of a virtual universe.

LocationThreshold 506 is a field storing a predefined variable that is used to identify a method for collecting user display setting data. For example, methods for collecting user display settings may be based upon the number of objects in a particular location. Thus, the threshold value stored in LocationThreshold 506 may be referenced by a color controller to determine whether a method for collecting user display setting data should be changed.

FIG. 6 is a block diagram of an object avatar rendering table in accordance with an illustrative embodiment. Object avatar rendering table 600 is an example of data in an object avatar rendering table, such as object avatar rendering table 304 in FIG. 3.

RenderingUUID 602 is a primary key for object avatar rendering table 600. ObjectUUID 604 is a unique identifier for a selected object in a virtual universe. ObjectUUID 604 is a foreign key to the existing object table. AvatarUUID 606 is a foreign key to the existing avatar table. AvatarUUID 606 includes a unique identifier for each avatar in the viewable field of the object associated with ObjectUUID 604.

Zone1EnterTime 608 is a field of a date and/or time when an avatar enters a first zone within the viewable field of an object. Zone1LeaveTime 610 is a field for a date and/or time when the avatar leaves the first zone. Zone2EnterTime 612 is a field in object avatar rendering table 600 for storing a date and/or time when an avatar enters a second zone. The second zone may be an area that is outside the viewable field. In other words, the second zone is an area in which an avatar cannot see the selected object, but the area is in close proximity to the viewable field in which the avatar will be able to see the object. Thus, when an avatar enters the second zone, the object avatar tracking controller software may begin preparing to display the object to the avatar when the avatar does eventually enter the viewable field.

Zone2LeaveTime 614 is a field for storing the date and/or time when a given avatar leaves the second zone. NumberofZone1Enters 616 is a field for storing the number of times a particular avatar has entered the first zone. This information may be useful to determine whether a user operating the particular avatar has never viewed the object. If the user has never viewed the object, then the content associated with an object should be displayed in full to the user associated with the avatar. The information in NumberofZone1Enters 616 is also used to determine whether the user has viewed the object one or more times in the past, and therefore, the content associated with the object should be displayed in part, skip introductory material, be modified or abbreviated, or otherwise altered so that the exact same content is not displayed to the user every time the user is within the viewable field of the object.

NumberofZone2Enters 618 is a field for storing the number of times an avatar has entered the second zone. LastCoordinates 620 is a field for storing the coordinate data describing where a given avatar is within the first zone or the second zone of a selected object. The coordinate data is typically given in xyz type coordinate data.

Figure 7:
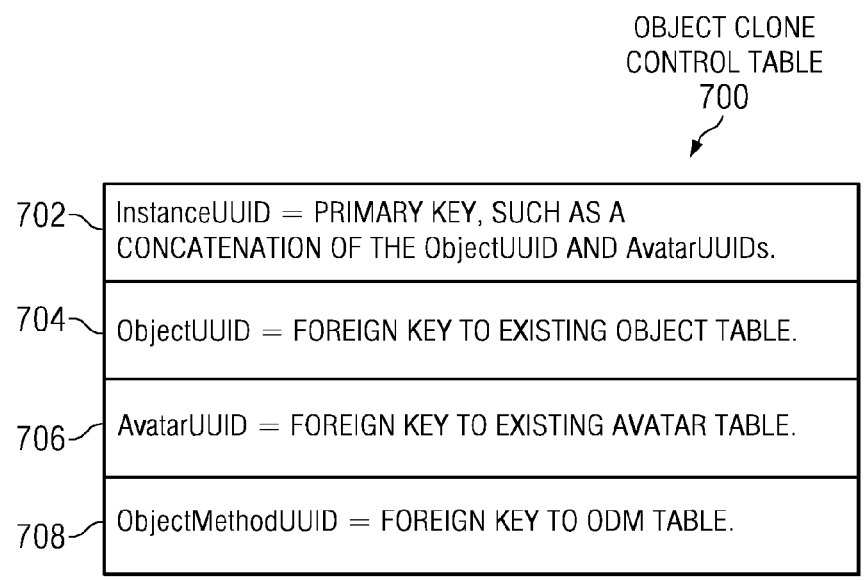
FIG. 7 is a block diagram of an object clone control table in accordance with an illustrative embodiment.

FIG. 7 is a block diagram of an object clone control table in accordance with an illustrative embodiment. Object clone control table 700 is an example of data in an object clone control table, such as object clone control table 322 in FIG. 3.

InstanceUUID 702 is a primary key for object clone control table 700. In one embodiment, InstanceUUID 702 is a concatenation of avatar and object UUIDs.

ObjectUUID 704 is a unique identifier for a selected object in a virtual universe. ObjectUUID 704 is a foreign key to the existing object table. AvatarUUID 706 is a foreign key to the existing avatar table. AvatarUUID 706 includes a unique identifier for each avatar in the viewable field of the object associated with ObjectUUID 704. ObjectMethodUUID 708 is a foreign key linking to an object dynamic methods table, such as object dynamic methods table 800 in FIG. 8.

Figure 8:
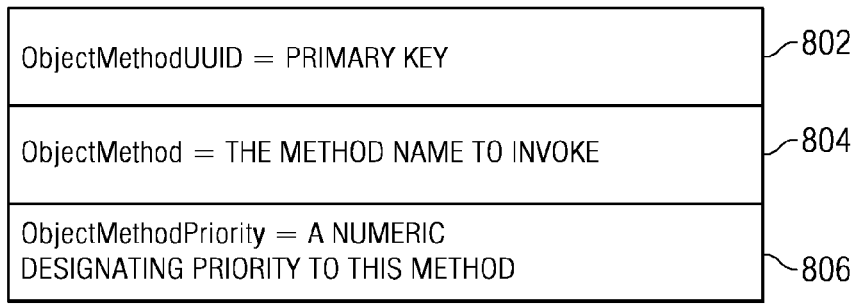
FIG. 8 is a block diagram of an object dynamic methods table in accordance with an illustrative embodiment.

FIG. 8 is a block diagram of an object dynamic methods table in accordance with an illustrative embodiment. Object dynamic methods table 800 is an example of data in a dynamic methods table, such as object dynamic methods table 324 in FIG. 3.

ObjectMethodUUID 802 is a primary key for object clone control table 700 in FIG. 7. ObjectMethodUUID 802 is related to ObjectMethodUUID 708 in FIG. 7 for identifying the method(s) that may be invoked with respect to a clone identified by InstanceUUID 702 in FIG. 7.

ObjectMethod 804 is a field of data storing the name of the method that may be invoked for application to an object. ObjectMethod 804 may include one or more methods that may be invoked for application to an object. The order in which the methods are to be invoked is determined according to priority logic. In one embodiment, the priority logic specifies that methods are invoked in accordance with a relative priority ranking. The rankings may be stored in ObjectMethodPriority 806.

ObjectMethodPriority 806 is a field storing a numeric designating the priority in which methods of object dynamic methods table 800 may be invoked. For example, in the event that multiple methods are queried for an object, or a clone of the object, the numeric in ObjectMethodPriority 806 may be referenced to determine the order in which the methods are to be invoked.

In an illustrative embodiment, object clone control table 700 in FIG. 7 and object dynamic methods table 800 are linked by an ObjectMethodUUID field, such as ObjectMethodUUID 708 in FIG. 7 and ObjectMethodUUID 804 in FIG. 8. The linking of object clone control table 700 in FIG. 7 and object dynamic methods table 800 in FIG. 8 enables a clone controller, such as clone controller 320 in FIG. 3, to determine whether a clone of an object exists. For example, the clone controller may determine that a clone of an object exists if there exists in an object clone control table an InstanceUUID identifying a clone of the object. In one embodiment, this determination may be initiated when an avatar enters a detection area of an object.

The entrance of an avatar into the detection area of an object may also cause a clone controller to instantiate a set of object clones. Thus, an avatar may be presented with two clones for an object. The first clone may be of an object located at a fixed point. The second clone may be of an object that remains in the field of view of the avatar regardless of the direction in which the avatar is facing.

Further, the clone controller may use linked object clone control table 700 in FIG. 7 and object dynamic methods table 800 in FIG. 8 to invoke a set of object methods associated with the clone identified by the unique InstanceUUID. In one embodiment, the set of methods may be invoked when an avatar enters a viewable area of an object. Viewable areas are discussed in more detail in FIG. 10.

Figure 9:
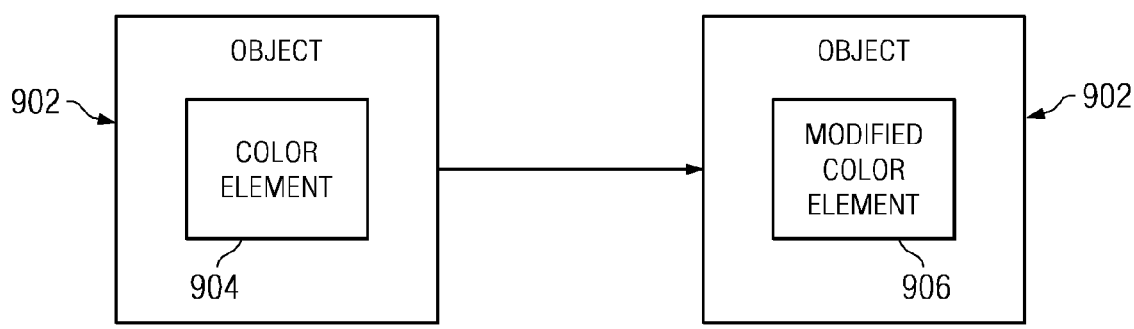
FIG. 9 is a diagram of a modification of a color element of an object in accordance with an illustrative embodiment.

FIG. 9 is a diagram of a modification of a color element of an object in accordance with an illustrative embodiment. Object 902 is an entity in a virtual universe that is not directly controlled by a user or associated with a user's account. An object may be, for example, buildings, statues, billboards, signs, and advertisements in the virtual universe. In this example, object 902 is an advertisement, such as a billboard or a sign.

Object 902 includes color element 904. Color element 904 is a color applied to a set of pixels or geometries of object 902 as defined by texture data associated with object 902. The color may be expressed in terms of RGB values. Before object 902 is presented to an avatar in the viewable range of object 902, one or more methods may be invoked to modify the appearance of object 902. Object 902 may be modified by changing color element 904 to offset user display settings that may make object 902 more difficult to discern. For example, if user selects display settings with a low contrast setting, then color element 904 may be modified to form modified color element 906. Modified color element 906 is a color element of object 902, which has RGB values that increase the contrast of object 902.

Figure 10:
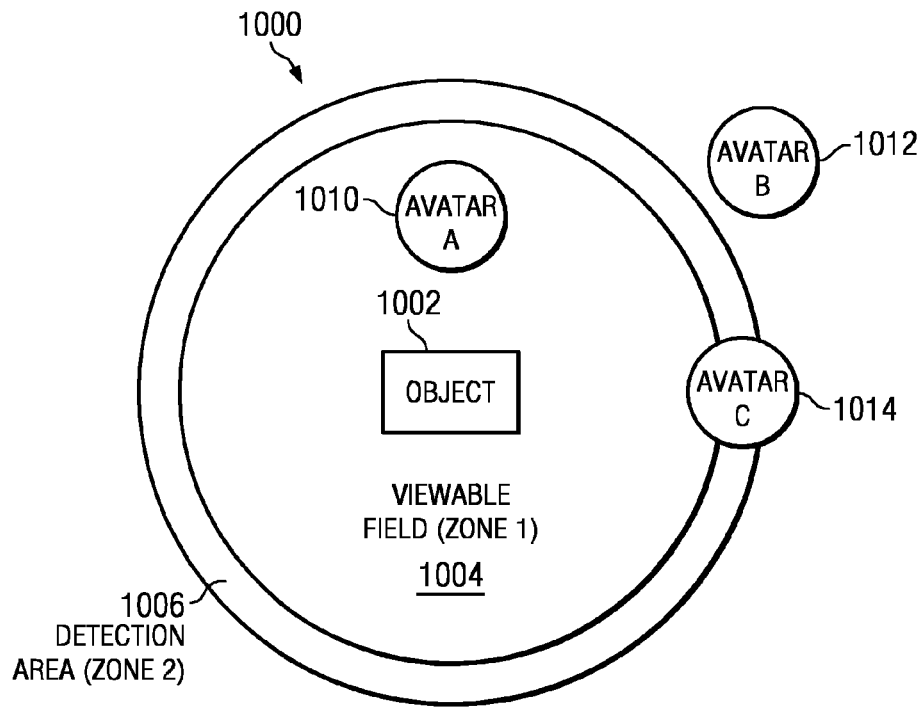
FIG. 10 is a block diagram of a viewable area for an object in accordance with an illustrative embodiment.

FIG. 10 is a block diagram of a viewable area for an object in accordance with an illustrative embodiment. Range 1000 is defined with respect to object 1002. Object 1002 is an entity in a virtual universe that is not directly controlled by a user or associated with a user's account. An object may be, for example, buildings, statues, billboards, signs, and advertisements in the virtual universe. In this example, object 1002 is an advertisement, such as a billboard or a sign. Range 1000 is an area associated with the viewing of object 1002. Range 1000 includes viewable field 1004 and detection area 1006 associated with object 1002 in a virtual universe.

Viewable field 1004 is an area in a given proximity of object 1002. Viewable field 1004 has a focal point or center at a location that is the same as the location of object 1002. Viewable field 1004 may also be referred to as zone 1 or a first zone. An avatar in viewable field 1004 is able to see or view object 1002 and/or content associated with object 1002. For example, object 1002 may be associated with video and/or audio content. Object 1002 may have some movement associated with the object. For example, object 1002 may be capable of some limited movement or animation. However, object 1002 is substantially limited to a single location in the virtual universe.

Detection area 1006 is an area adjacent to viewable field 1004 within range 1000. Detection area 1006 may also be referred to as a second zone or zone 2. An avatar in detection area 1006 cannot see object 1002 or view content associated with object 1002. However, when an avatar enters detection area 1006, the object avatar tracking controller software can begin preparing to display object 1002 and content associated with object 1002 to the avatar when the avatar enters viewable field 1004.

In this example, avatar A 1010 is within viewable field 1004. Therefore, avatar A 1010 is able to view or see object 1002. Avatar B 1012 is not able to see or view object 1002. In addition, avatar B 1012 is not close enough to viewable field 1004 to indicate that avatar B 1012 may be preparing to enter viewable field 1004. Avatar C 1014 is within detection area 1006. Avatar C 1014 is not able to see or view object 1002. However, the presence of avatar C 1014 indicates that avatar C 1014 may be about to enter viewable field 1004 or that avatar C 1014 has just left viewable field 1004. Avatar B 1012 is outside range 1000. Therefore, an object avatar tracking table for object 1002 includes entries for avatar A 1010 in zone 1 and avatar C 1014 in zone 2. However, the object avatar tracking table will not include data or records for avatar B 1012 because avatar B 1012 is outside both viewable field 1004 and detection area 1006.

Objects are prevalent in virtual universes. The illustrative embodiments recognize that objects in a particular user's viewable field may be obstructed from view by one or more other objects such that a user cannot see the object because of the obstruction. In such cases, the focal point of the viewable area for an object may be set at a location other than the location of the object.

Figure 11:
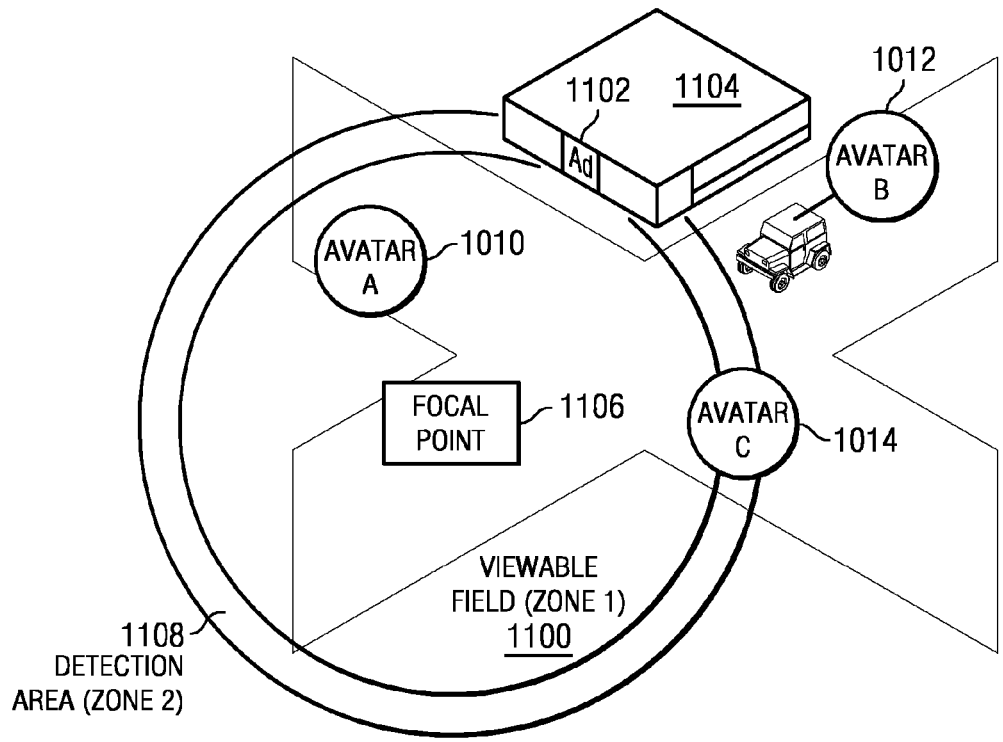
FIG. 11 is a block diagram of a viewable area for an object having a focal point at a location other than the location of the object in accordance with an illustrative embodiment.

FIG. 11 is a block diagram of a viewable area for an object having a focal point at a location other than the location of the object in accordance with an illustrative embodiment. Viewable field 1100 is a viewable field for object 1102. Object 1102 is an object, such as object 902 in FIG. 9. In this example, object 1102 is an advertisement in front of object 1104. Viewable field 1100 is a range in which an avatar, such as avatar A 1010, avatar B 1012, and avatar C 1014 can see object 1102.

Viewable field 1100 has focal point 1106. Focal point 1106 is a point from which the range, or area, of viewable field 1100 for an object is determined. In other words, viewable field 1100 is an area that is identified based on a predetermined radius or distance from focal point 1106. Here, focal point 1106 is a location that is different from the location of object 1102 because object 1102 is adjacent to an obstructing object, such as object 1104.

In this example, when avatar C 1014 comes in range of detection area 1108 of object 1102, object based avatar tracking controller, such as object based avatar tracking controller 310 in FIG. 3, makes a determination as to whether there is an existing session associated with the unique identifier of object 1102 and the unique identifier of avatar C 1014. This step may be implemented by making a query to the object avatar rendering table to determine if avatar C 1014 has ever entered zone 2 or zone 1 previously. If there is not an existing session for avatar C 1014, the object based avatar tracking controller creates a record in the object avatar rendering table with the unique identifier of object 1102 and the unique identifier of avatar C 1014.

The record in the object avatar rendering table may optionally include additional information, such as, without limitation, a date and time when avatar C 1014 entered zone 2, a date and time when avatar C 1014 leaves zone 2, a date and time when avatar C 1014 enters zone 1, a number of zone 2 enters, a number of zone 1 enters, coordinates of avatar C 1014, and any other data describing avatar C 1014. This data is used by the virtual universe grid software for analysis, reporting, and billing purposes.

Object 1102 may have an initiation process associated with object 1102. For example, if object 1102 is an advertisement with an audio and video content associated with viewing object 1102, an initiation process may include buffering the audio and/or video content, checking a cache for the audio and/or video content, caching the audio and/or video content, or any other initiation process. In another embodiment, the initiation process may include sending messages to a clone controller, such as clone controller 320 in FIG. 3. The message may notify the clone controller to retrieve tracking data, such as tracking data 312 in FIG. 3, because an avatar is in range of object 1102. In addition, the initiation process may include querying databases to determine the existence of clones of object 1102.

When avatar C 1014 enters viewable field 1100, an object based avatar tracking controller may trigger any object initiation process defined by object 1102. For example, when avatar C 1014 enters viewable field 1100, the object based avatar tracking controller may display the buffered or cached content. If a user is viewing the object for the first time and object 1102 has a video or audio file associated with viewing the object, the process starts playing the video or audio from the beginning.

In another embodiment, a clone controller, such as clone controller 320 in FIG. 3, may query an object clone control table, such as object clone control table 700 in FIG. 7, and/or instantiate a clone of object 1102 when avatar C 1014 enters detection area 1108. Thereafter, when avatar C 1014 enters viewable field 1100, a clone controller may invoke a set of methods associated with the object clone of object 1102 for presentation to avatar C 1014.

If a session already exists, the object based avatar tracking controller triggers any object re-initiation process defined by the object. For example, if the user is not viewing an object with an associated video for the first time, the process starts playing the video at a point in the video after the beginning, such as after an introduction, in a middle part, or near the end of the video to avoid replaying introductory material.

The object based avatar tracking controller makes a determination as to whether the position of avatar C 1014 has changed. Changing position may include traveling, turning, walking, or disappearing, such as teleporting, logging off, or disconnecting. When the position of avatar C 1014 changes, the object based avatar tracking controller adds the user position data to the object avatar rendering table, such as at a field for LastCoordinates 620 in FIG. 6. The user position data includes angle of view coordinate data of the avatar relative to object 1102 and the distance of avatar C 1014 to object 1102.

A clone controller, such as clone controller 320 in FIG. 3 may then modify object 1102 according to a set of methods stored in an object dynamic methods table, such as object dynamic methods table 800 in FIG. 8. Modifications may be made by invoking an object method that is selected, in part, upon user position data. The modification of object 1102 is capable of improving the visibility of object 1102 to an avatar in viewable field 1100.

When avatar C 1014 is out of range of viewable field 1100 and detection area 1108, the object based avatar tracking controller logs a session pause for the session associated with avatar C 1014. The log may include the date and time of the session pause. When the session has been paused for an amount of time that exceeds a threshold amount of time, the object based avatar tracking controller terminates the session associated with avatar C 1014. The process termination may include, without limitation, removing the records and data associated with avatar C 1014 from the object avatar rendering table. If the record is not deleted, when avatar C 1014 comes back into range of zone 1 or zone 2 of object 1102, the object based avatar tracking controller determines that an existing session associated with the unique identifier of object 1102 and a unique identifier of avatar C 1014 already exist. In such a case, a new record for avatar C 1014 will not be created. Instead, the data in the object based avatar rendering table will be updated with new data regarding avatar C 1014 in the range of object 1102.

Figure 12:
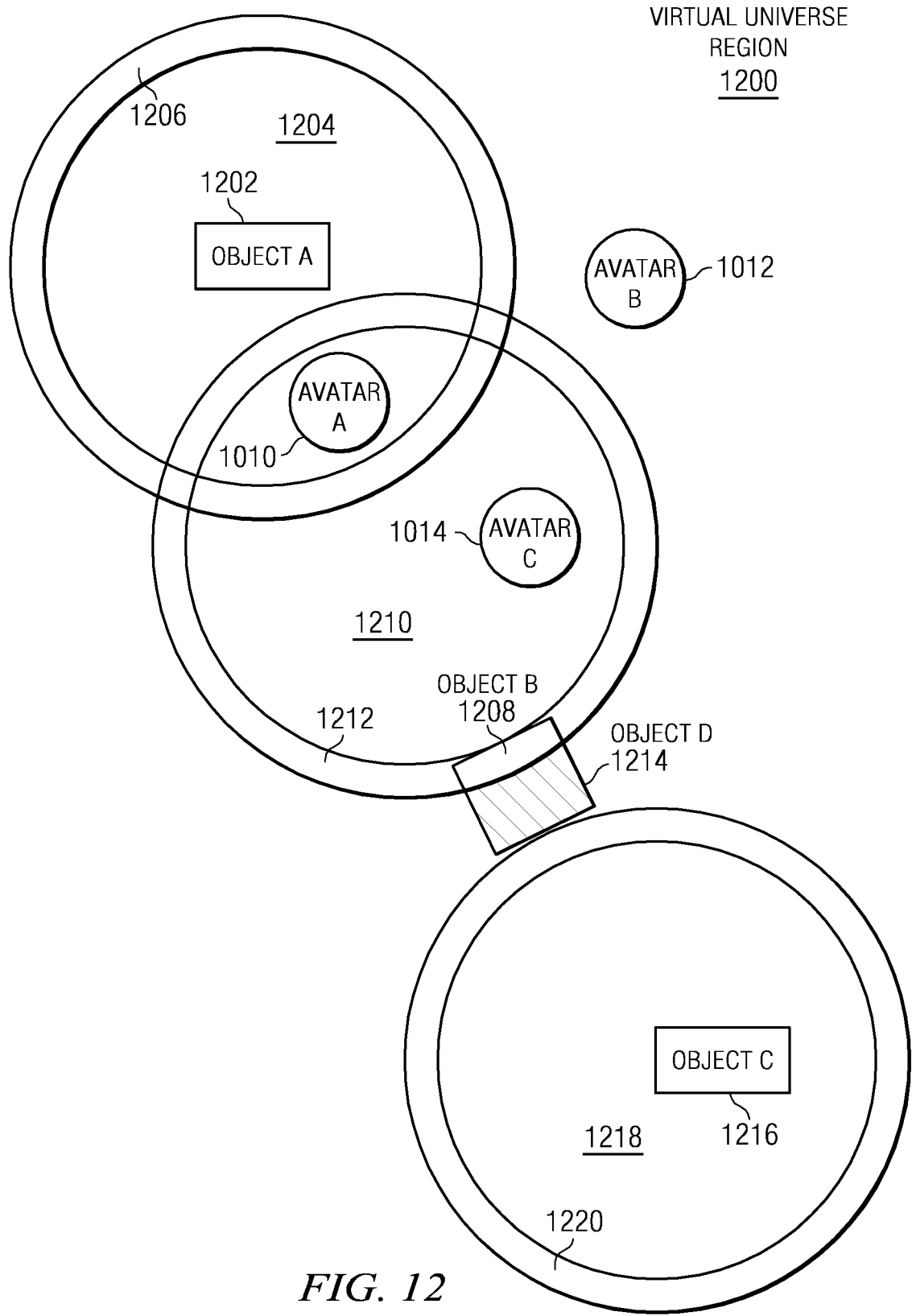
FIG. 12 is a block diagram of virtual universe region having a set of objects in accordance with an illustrative embodiment.

FIG. 12 is a block diagram of virtual universe region having a set of objects in accordance with an illustrative embodiment. Virtual universe region 1200 is a area in a virtual universe. In this example, virtual universe region 1200 is associated with a server, such as server 104 in FIG. 1. Each region in a virtual universe is typically supported by a different server.

Object A 1202 is associated with viewable field 1204. Object A 1202 may also optionally have a detection area 1206. Viewable field 1210 is a viewable area associated with object B 1208. Object B 1208 may also have detection area 1212. In this example, viewable field 1210 overlaps in part with a portion of viewable field 1204. Object C 1216 is associated with viewable field 1218. Object C 1216 is optionally associated with detection area 1220.

In this example, avatar A 1010 is within viewable field 1204 of object A 1202 and viewable field 1210 of object B 1208. In other words, avatar A 1010 can see object A 1202 or object B 1208. Avatar C 1014 is within viewable field 1210 of object B 1208. Avatar C 1014 is able to see or view object B 1208. Avatar B 1012 is outside the viewable fields of objects 1202, 1208, 1214, and 1216.

The number of objects in virtual universe region 1200 may dictate the selection of a method for collecting display setting data. For example, an object tracking record, such as object tracking record 500 in FIG. 5, may include a field, such as LocationThreshold 506, storing a value corresponding to a threshold number of objects in a virtual universe region. A method for collecting display setting data may be selected based on whether the number of objects in the virtual universe region is above or below the threshold number of objects. As the number of objects in a virtual universe region increases, certain display setting data collection methods may become overly burdensome. For example, if the number of objects in virtual universe region 1200 exceeds a threshold specified in a LocationThreshold 506 in FIG. 5, display setting data collection based upon an object's request may consume enough server and/or client resources, which may result in interruptions of game play. Thus, display setting data collection for virtual universe region 1200 may be changed so that the display setting data is collected upon user login or on display setting changes.

FIG. 13 is a block diagram of a set of clones presented to a set of avatars in accordance with an illustrative embodiment. The set of clones are clones of object 1302.

Object 1302 is associated with a range having viewable field 1304 and detection area 1306. In this example, avatar A 1010 and avatar B 1012 are located within viewable field 1304. Avatar C 1014 is located outside of the range of object 1302.

Because avatar A 1010 and avatar B 1012 are located within viewable field 1304, avatar A 1010 and avatar B 1012 are presented with object clone 1308 and object clone 1310, respectively. Object clones 1308 and 1310 are clones of object 1302. Each clone of object 1302 may be rendered differently according to the various methods associated therewith. For example, because avatar A 1010 is located further from object 1302, then object clone 1308 may be a clone of object 1302 modified by a geometric and texture modification method that enhances or modifies the color of object 1302.

In addition, because avatar B 1012 is located closer to object 1302, but at an angle to object 1302, then object clone 1310 may be a clone of object 1302 modified by a geometric and texture modification method that eliminates glare that may reflect from object 1302.

FIG. 14 is a block diagram of an object based avatar table for a plurality of objects in accordance with an illustrative embodiment. Object based avatar table 1400 is an object based avatar table for a plurality of selected objects. In this example, object based avatar table 1400 includes a unique identifier for selected object A 1402 and object B 1420. Data describing avatars for each selected object are also included.

For example, object based avatar table 1400 includes avatar A UUID 1404, avatar A zone 1 enter time 1406, avatar A zone 2 enter time 1408, avatar A zone 1 leave time 1410, and avatar A zone 2 leave time 1412. Object based avatar table 1400 includes data regarding avatars associated with zone 1 and zone 2 of object B 1420. For example, and without limitation, object based avatar table 1400 includes avatar A UUID 1422, avatar A zone 1 enter time 1424, avatar A zone 2 enter time 1426, avatar A zone 1 leave time 1428, avatar A zone 2 leave time 1430, avatar C UUID 1432, avatar C zone 1 enter time 1434, avatar C zone 2 enter time 1436, avatar C zone 1 leave time 1438, and avatar C zone 2 leave time 1440.

The fields and data shown in object based avatar table 1400 are only examples of fields and data that may be included in an object based avatar table. However, implementations of object based avatar tables are not limited to only including the data and/or fields shown in FIG. 14. An object based avatar table may include additional data and/or additional fields not shown in FIG. 14.

In addition, object based avatar table 1400 in this example only includes data and fields for two objects and two different avatars. However, an object based avatar table may include fields and/or data for any number of objects and any number of avatars. In other words, object based avatar table 1400 may include fields and/or data for a single object, as well as two or more objects. Likewise, object based avatar table 1400 may include fields and/or data for tracking a single avatar associated with each object, as well as two or more avatars associated with each object's viewable field and/or detection area.

Figure 15:
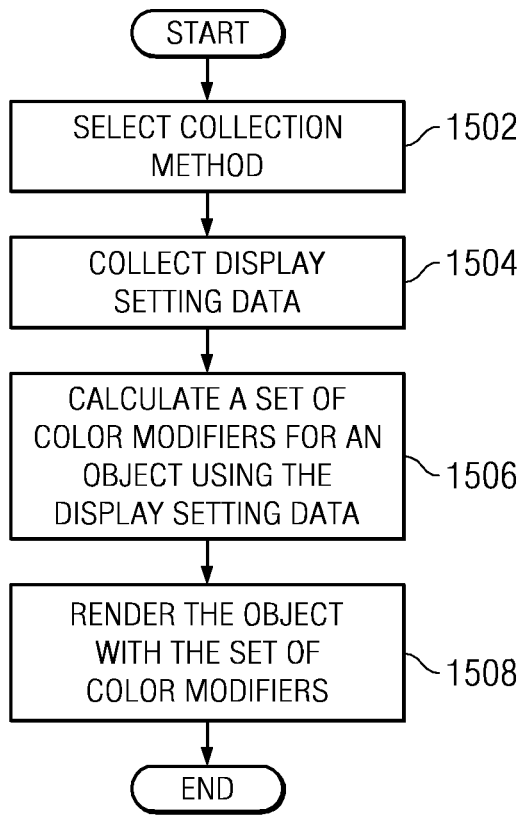
FIG. 15 is a flowchart of a process for rendering an object with a modified color in accordance with an illustrative embodiment.

FIG. 15 is a flowchart of a process for rendering an object with a modified color in accordance with an illustrative embodiment. The process may be implemented in a software component, such as color controller 332 in FIG. 3.

The process begins by selecting a collection method (step 1502). The collection method may be selected using criteria, such as, for example, a number of objects in the region coinciding with a location of a set of avatars. The process then collects display setting data (step 1504). Thereafter, the process calculates a set of color modifiers for an object using the display setting data (step 1506). The process then renders the object using the set of color modifiers (step 1508) and the process terminates.

Figure 16:
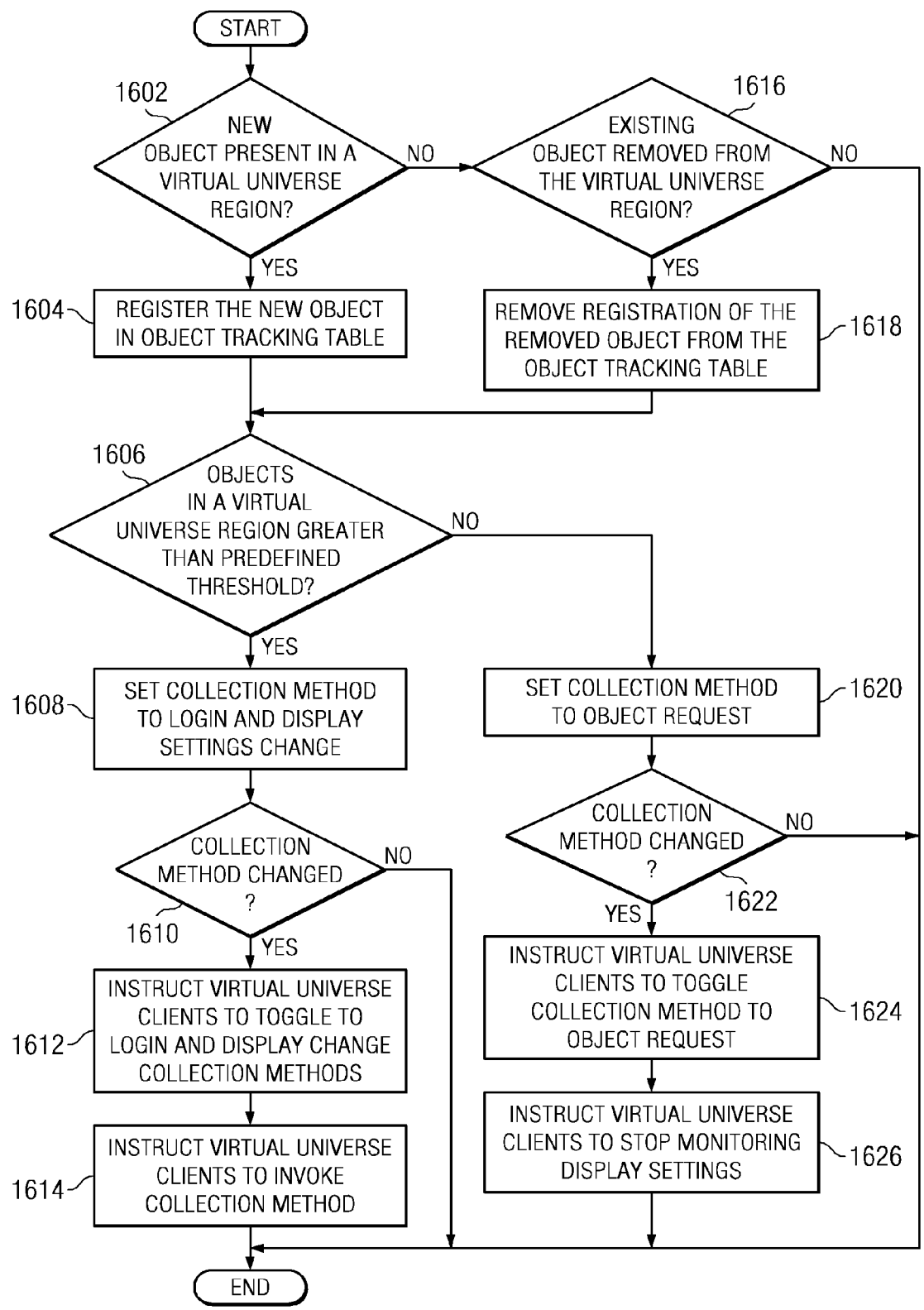
FIG. 16 is a flowchart of a process for selecting a collection method in accordance with an illustrative embodiment.

FIG. 16 is a flowchart of a process for selecting a collection method in accordance with an illustrative embodiment. The process may be implemented in a software component, such as color controller 332 in FIG. 3.

The process begins by making the determination as to whether a new object is present in a virtual universe region (step 1602). If the process makes the determination that a new object is present in the virtual universe region, the process registers the new object in an object tracking table (step 1604).

The process then makes the determination as to whether the objects in the virtual universe region are greater than a predefined threshold (step 1606). If the process makes the determination that the objects in the virtual universe region are greater than the predefined threshold, then the process sets the collection method to login and display settings change (step 1608).

The process then makes the determination as to whether the collection method has changed (step 1610). If the collection method has not changed, then the process terminates. Otherwise, if the process makes the determination that the collection has changed, then the process instructs the virtual universe clients to toggle to login and display change collection methods (step 1612). Subsequently, the process instructs the virtual universe clients to invoke the toggled collection method (step 1614) and terminates thereafter.

With reference now to step 1602, if the process makes the determination that a new object is not present in the virtual universe region, then the process makes the determination as to whether an existing object was removed from the virtual universe region (step 1616). If an existing object was not removed from the virtual universe region, then the process terminates. However, if the process makes the determination that an existing object was removed from the virtual universe region, then the process removes the registration of the removed object from the object tracking table (step 1618) and continues to step 1606.

At step 1606, if the process makes the determination that objects in the virtual universe region is less than the predefined threshold, then the process sets the collection method to object request (step 1620). Thereafter, the process makes the determination as to whether the collection method has changed (step 1622). If the process makes the determination that the collection method has not changed, then the process terminates. Otherwise, if the process makes the determination that the collection method has changed, then the process instructs the virtual universe clients to toggle the collection method to the object request collection method (step 1624). The process then instructs the virtual universe clients to stop monitoring display settings (step 1626). The process terminates thereafter.

Figure 17:
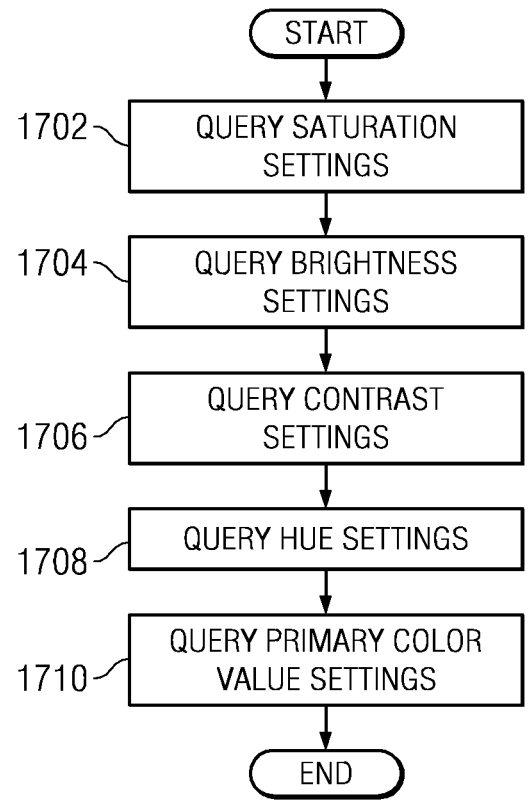
FIG. 17 is a process for collecting display setting data in accordance with an illustrative embodiment.

FIG. 17 is a process for collecting display setting data in accordance with an illustrative embodiment. The process may be implemented in a software component, such as color controller 332 in FIG. 3.

The process begins by querying saturation settings (step 1702). The process then queries brightness settings (step 1704). Thereafter, the process queries contrast settings (step 1706). Next, the process queries hue settings (step 1708). The process subsequently queries primary color value settings (step 1710) and terminates.

The data collected by this collection process may be stored in a display setting table, such as display setting table 338 in FIG. 3. This data may then be used for modifying an object color in accordance with the illustrative embodiments disclosed herein.

Figure 18:
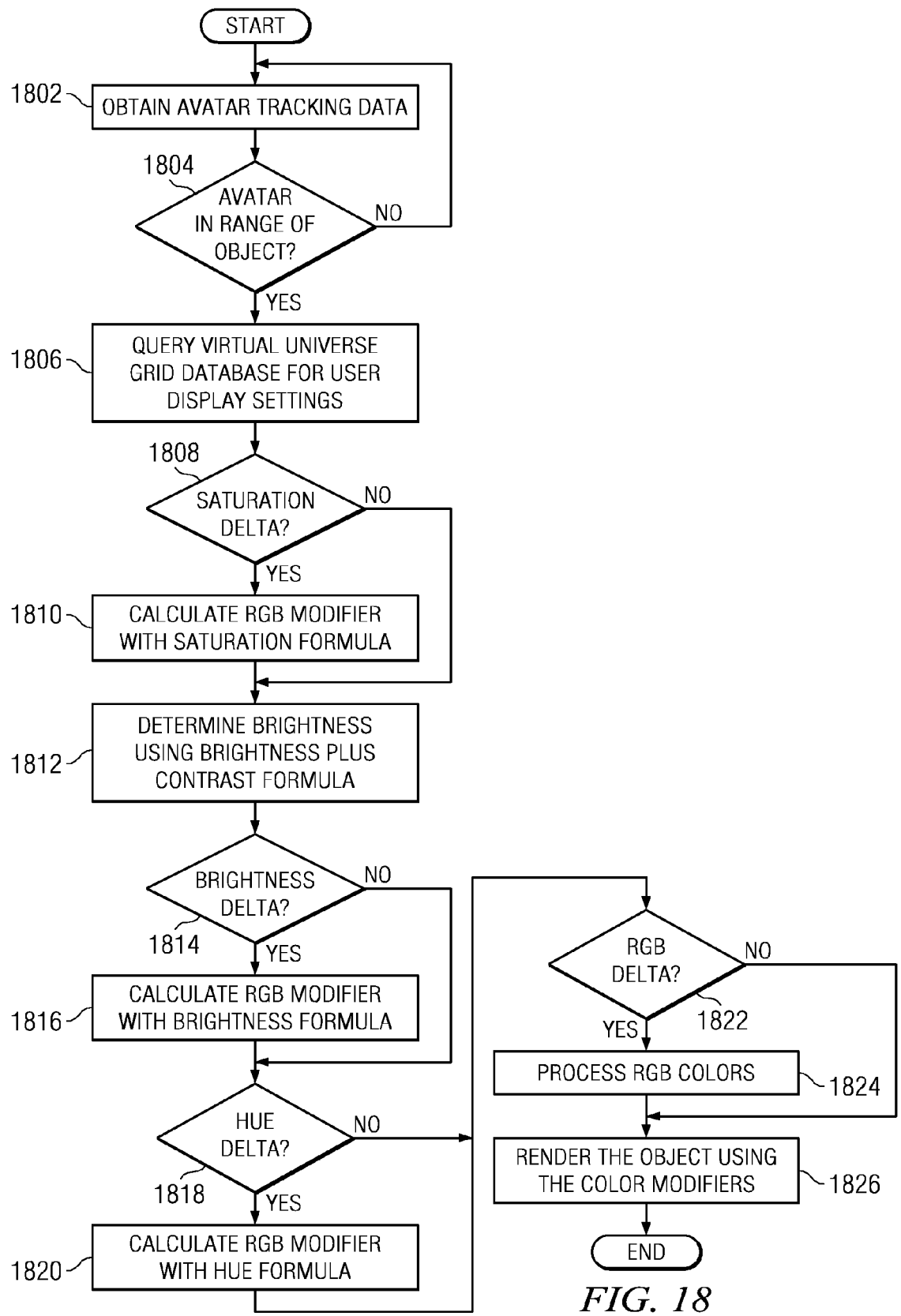
FIG. 18 is a flowchart of a process for calculating a modified color of an object based on stored modifiers in accordance with an illustrative embodiment.

FIG. 18 is a flowchart of a process for calculating a modified color of an object based on stored modifiers in accordance with an illustrative embodiment. The process may be implemented in a software component, such as color controller 332 in FIG. 3.

The process begins by obtaining avatar tracking data (step 1802). In one embodiment, a color controller may obtain the tracking data by retrieving (or "pulling") the data from a data structure, such as object avatar rendering table 304 in FIG. 3. In another embodiment, the color controller may receive the tracking data from another software component. For example, the tracking data may be "pushed" to the color controller from an object based avatar tracking controller, such as object based avatar tracking controller 310 in FIG. 3. The tracking data may then be used to identify a location of an avatar in relation to an object in a virtual universe.

The process then makes the determination as to whether the avatar is in range of an object (step 1804). If he process makes the determination that the avatar is not in the range of the object, then the process returns to step 1802. However, if the process makes the determination that the avatar is in the range of the object, then the process queries the virtual universe grid database for user display settings (step 1806). The user display settings may be stored in a data structure, such as user display setting table 338 in FIG. 3.

The process then makes the determination as to whether there is a saturation delta (step 1808). If the process makes the determination that there is a saturation delta, then the process calculates the primary color value modifier with a saturation modification formula (step 1810). The process then determines brightness using a brightness plus contrast formula (step 1812). If at step 1808 the process makes the determination that no saturation delta exists, the process continues to step 1812.

The process makes the determination as to whether there exists a brightness delta (step 1814). If the process makes the determination that there is a brightness delta, then the process calculates the primary color value modifier with the brightness modification formula (step 1816). The process then makes the determination as to whether there exists a hue delta (step 1818). If the process makes the determination that there is a hue delta, then the process calculates the primary color values with a hue modification formula (step 1820). The process then makes the determination as to whether there exists a primary color value delta (step 1822). If the process makes the determination that there exists a primary color value delta, the primary color values are processed (step 1824). Steps of this processing are provided in FIG. 19.

The process then renders the object using the calculated color modifiers (step 1826). The process terminates thereafter.

Returning now to step 1814, if the process makes the determination that no brightness delta exists, the process continues to step 1818. Similarly, at step 1818, if the process makes the determination that no hue delta exists, the process continues to step 1822. In addition, at step 1822, if the process makes the determination that no primary color value delta exists, the process continues to step 1826.

Figure 19:
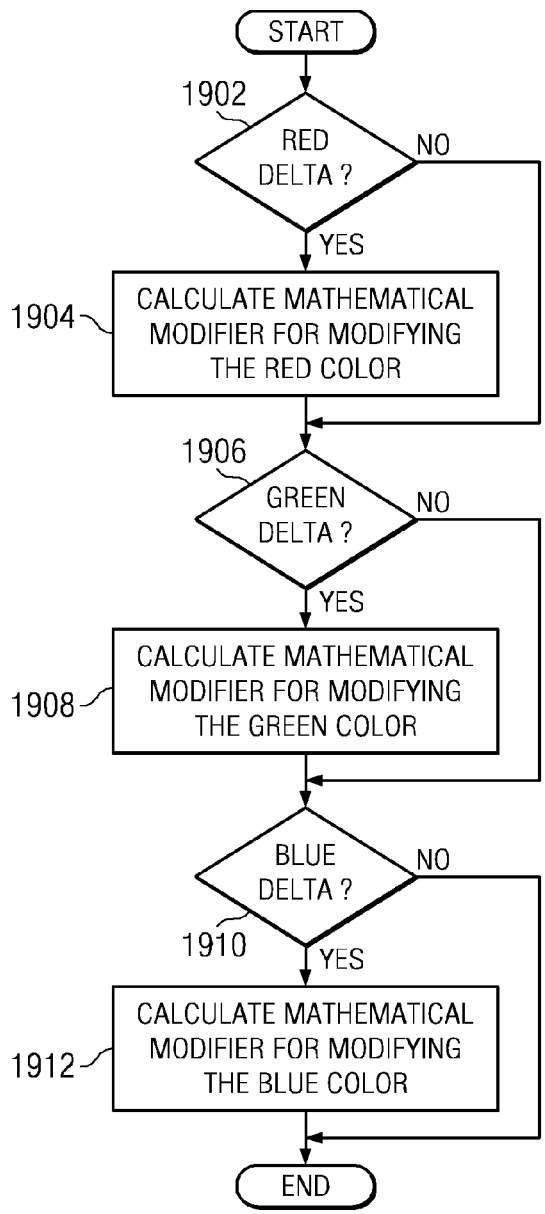
FIG. 19 is a flowchart of steps for processing primary color values in accordance with an illustrative embodiment.

FIG. 19 is a flowchart of steps for processing primary color values in accordance with an illustrative embodiment. The steps of the process may be implemented in a software component, such as color controller 332 in FIG. 3.

The process begins by making the determination as to whether there exists a red delta (step 1902). If the process makes the determination that a red delta exists, the process calculates a mathematical modifier for modifying the red color value (step 1904).

The process then makes the determination as to whether there exists a green delta (step 1906). If the process makes the determination that a green delta exists, the process calculates a mathematical modifier for modifying the green color value (step 1908).

Thereafter, the process makes a determination as to whether there exists a blue delta (step 1910). If the process makes the determination that a blue delta exists, then the process calculates the mathematical modifier for modifying the blue color value (step 1912) and the process terminates.

Returning now to step 1902, if the process makes the determination that a red delta does not exist, then the process proceeds to step 1906. Similarly, at step 1906, if the process makes the determination that a green delta does not exist, then the process continues to step 1910. At step 1910, if the process makes the determination that the a blue delta does not exist, then the process terminates.

Figure 20:
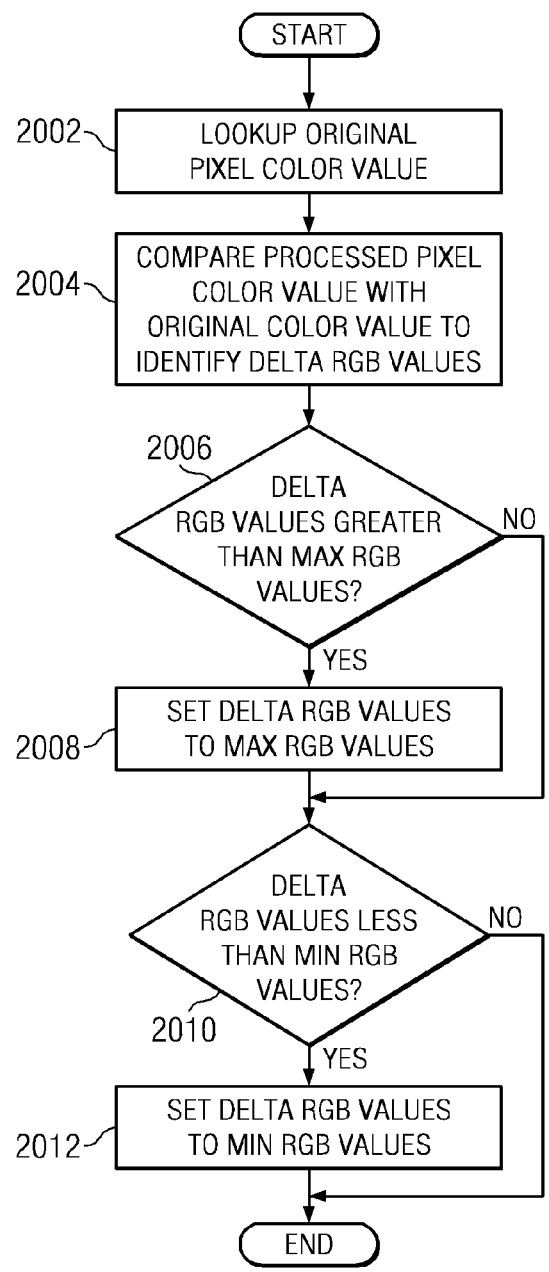
FIG. 20 is a flowchart of a process for limiting object color values to an object rendering in accordance with an illustrative embodiment.

FIG. 20 is a flowchart of a process for limiting object color values to an object rendering in accordance with an illustrative embodiment. The process in FIG. 20 may be implemented by software for controlling modification of object colors, such as color controller 332 in FIG. 3.

The process begins by performing a lookup of an original pixel color value (step 2002). The process then compares the processed pixel color values with the original pixel color values to identify delta RGB values (step 2004).

The process then makes the determination as to whether the delta RGB values are greater than the MaxRGB values (step 2006). If the process makes the determination that the delta RGB values are greater than the MaxRGB values, then the process sets the delta RGB values to the MaxRGB values (step 2008).

The process then makes the determination as to whether delta RGB values are less than MinRGB values (step 2010). If the process makes the determination that delta RGB values are less than MinRGB values, then the process sets the delta RGB values to the MinRGB values (step 2012). The process terminates thereafter.

Returning to step 2006, if the process makes the determination that no delta RGB values are greater than MaxRGB values, then the process skips to step 2010.

Referring to step 2010, if the process makes the determination that delta RGB values are not less than MinRGB values, then the process terminates.

Figure 21:
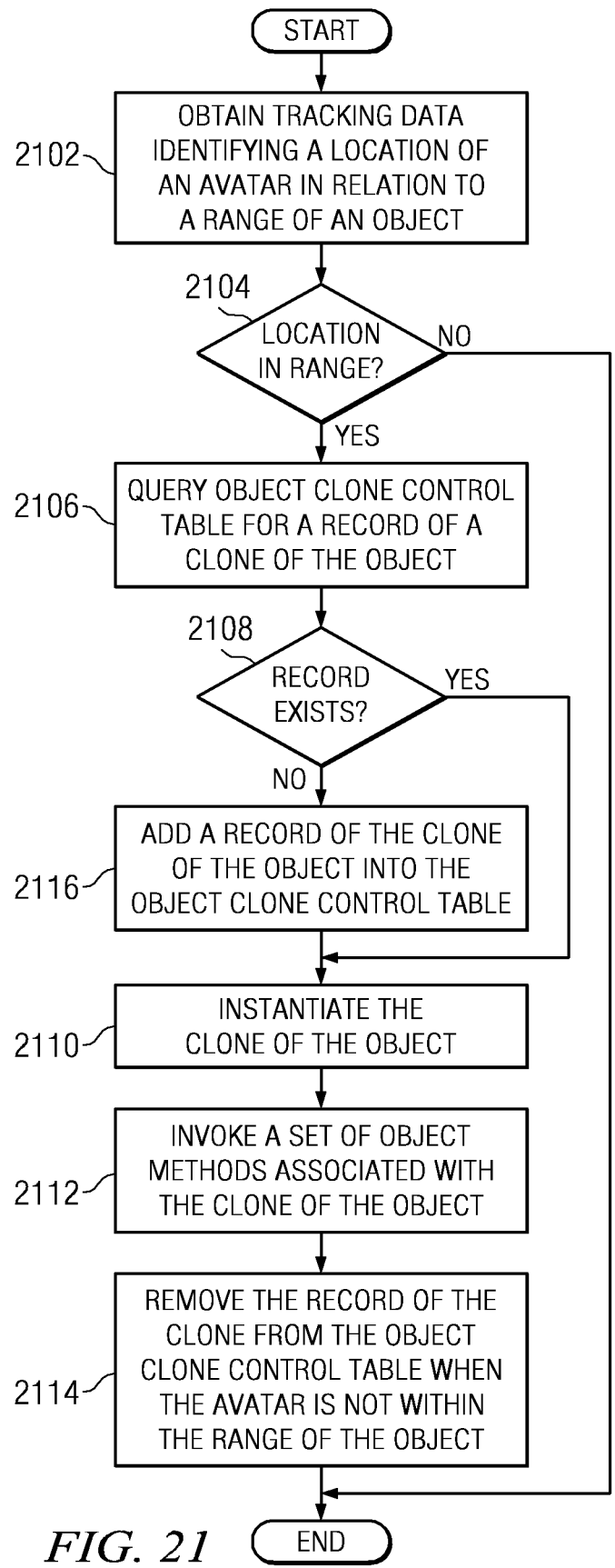
FIG. 21 is a flowchart of a process for cloning objects in a virtual universe in accordance with an illustrative embodiment.

FIG. 21 is a flowchart of a process for cloning objects in a virtual universe in accordance with an illustrative embodiment. The process in FIG. 21 is implemented by software for cloning objects, such as clone controller 320 in FIG. 3.

The process begins by obtaining tracking data identifying a location of an avatar in relation to a range of an object (step 2102). In one embodiment, a clone controller may obtain the tracking data by retrieving (or "pulling") the data from a data structure, such as object avatar rendering table 304 in FIG. 3. In another embodiment, the clone controller may receive the tracking data from another software component. For example, the tracking data may be "pushed" to the clone controller from an object based avatar tracking controller, such as object based avatar tracking controller 310 in FIG. 3.

The process then makes the determination as to whether the location of the avatar is in range of the object (step 2104). If the process makes the determination that the location of the avatar is not in range, then the process terminates. However, if the process makes the determination that the location of the avatar is in range of the object, then the process queries an object clone control table for a record of a clone of the object (step 2106).

The process then makes the determination as to whether the object clone control table includes the record of the clone of the object (step 2108). If the process makes the determination that the object clone control database does include a record of the clone of the object, then the process instantiates the clone of the object (step 2110).

The process then invokes a set of object methods associated with the clone of the object (step 2112). The process removes the record of the clone from the object clone control table when the location of the avatar is not within the range of the object (step 2114) and the process terminates. The removal of the record of the clone from the object clone control table may occur upon the expiration of a predetermined amount of time. The predetermined amount of time may specify that a length of time should expire after the avatar has left the range. Thus, the invention can avoid repeatedly initiating and removing the clone if the avatar is repeatedly moving in and out of range. In an alternate embodiment, the predetermined amount of time may be null. In this embodiment, the record of the clone is removed immediately after the avatar has left the range.

Returning now to step 2108, if the process makes the determination that the object clone control table does not have a record for the clone of the object, then the process adds a record of the clone of the object to the object clone control database before proceeding to step 2110.

Figures 22, 23:
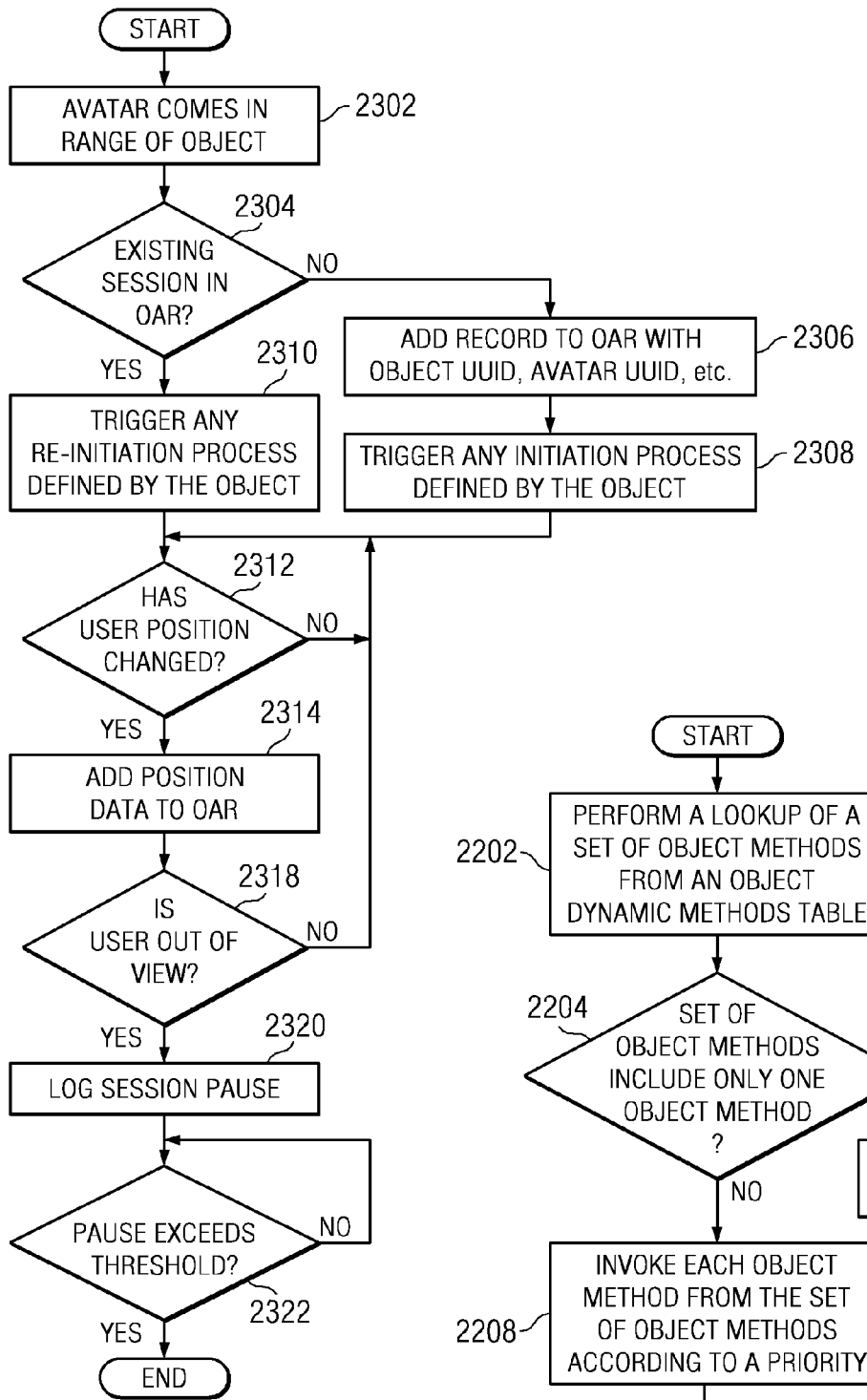
FIG. 22 is a process for invoking a set of object methods in accordance with an illustrative embodiment.
FIG. 23 is a flowchart of a process for identifying a location of an avatar in relation to a range of an object in accordance with an illustrative embodiment.

FIG. 22 is a process for invoking a set of object methods in accordance with an illustrative embodiment. The process in FIG. 22 may be implemented by software, such as clone controller 320 in FIG. 3.

The process begins by performing a lookup of the set of object methods from an object dynamic methods table (step 2202). The set of object methods may be found by correlating an ObjectMethodUUID field from the object clone control table with the object dynamic methods table. An example of the object clone control table is object clone control table 700 in FIG. 7. An example of the object dynamic methods table is object dynamic methods table 800 in FIG. 8.

The process then makes the determination as to whether the set of object methods includes more than one method objects (step 2204). If the process makes the determination that the set of object methods includes only one object method, then the process invokes the object method (step 2206) and terminates thereafter. However, if the process makes the determination that the set of object methods includes more than one object method, then the process invokes each object method from the set of object methods according to a priority (step 2208) and the process terminates.

FIG. 23 is a flowchart of a process for identifying a location of an avatar in relation to a range of an object in accordance with an illustrative embodiment. The process in FIG. 23 is implemented by software for tracking avatars in a range of an object, such as object based avatar tracking controller 310 in FIG. 3.

The process begins when an avatar comes in range of the object (step 2302). A determination is made as to whether there is an existing session associated with the unique identifier of the object and the unique identifier of the avatar (step 2304). This step may be implemented by making a query to the object avatar rendering table for the object. If there is not an existing session, the process creates a record in the object avatar rendering table with the unique identifier of the object and the unique identifier of the avatar (step 2306). The record in the object avatar rendering table may include other information, such as, without limitation, a date and time, which can be used for analysis, reporting, and billing purposes.

The process triggers any object initiation process defined by the object (step 2308). For example, if a user is viewing the object for the first time and the object has a video associated with viewing the object, the process starts playing the video from the beginning.

Returning to step 2304, if a session already exists, the process triggers any object re-initiation process defined by the object (step 2310). For example, if the user is not viewing an object with an associated video for the first time, the process starts playing the video at a point in the video after the beginning, such as after an introduction, in a middle part, or near the end of the video to avoid replaying introductory material.

The process makes a determination as to whether the user's position has changed (step 2312). Changing position may include traveling, turning, or disappearing, such as teleporting, logging off, or disconnecting. If the user's position has not changed, the process returns to step 2312. The process may return to step 2312 if the user's position does not change within a specified amount of time. The specified amount of time may be configured by the virtual universe grid administrator or object owner. The specified amount of time may occur very frequently, such as, without limitation, after a specified number of seconds or after a specified number of milliseconds.

When the user's position changes at step 2312, the process adds the user position data to the object avatar rendering table (step 2314). The user position data includes the angle of view coordinate data of the avatar relative to the object and distance of the avatar to the object. The process then performs an analysis of the position data and makes a determination as to whether the user is out of view (step 2318). The user may be out of view if the user or the user's avatar has disappeared or is no longer facing the object. If the user is not out of view, after a specified amount of time the process returns to step 2312. The specified amount of time may be configured by the virtual universe grid administrator or object owner. The specified amount of time may be, without limitation, a specified number of seconds or a specified number of milliseconds.

If the user is out of view at step 2318, the process logs a session pause (step 2320). The log may include the date and time. Next, the process makes a determination as to whether the session has been paused for an amount of time that exceeds a threshold amount of time (step 2322). The threshold amount of time may be configured by a virtual universe administrator. If the pause does not exceed the threshold, the process returns to step 2322. When the pause exceeds the threshold, the process terminates thereafter.

The process termination may include, without limitation, removing the records of the avatar from the object avatar rendering table. If the record is not deleted, when the avatar comes back into range of the object at step 2302, the process will make a determination at step 2304 that an existing session associated with the unique identifier of the object and a unique identifier of the avatar already exist.

Thus, the illustrative embodiments provide a computer implemented method, apparatus, and computer program product for modifying object colors in a virtual universe. In one embodiment, the process obtains avatar tracking data that identifies a location of an avatar in relation to a range of an object. The range includes a viewable field. The process then selects a data collection method based on the location of the set of avatars. In response to detecting an event for triggering modification of the object, the process calculates a set of color modifiers based on display setting data to form a modified color. Thereafter, the process renders the object using the modified color when the location of the set of avatars is within the range of the object.

Objects of a virtual universe may be modified to improve their visibility. The modifications may be made based upon a user's selected display settings. Display setting data may be converted to RGB values that are used for calculating a color modifier that may be applied to a rendering of an object. Improved visibility may increase the value of the object in the virtual universe.

Further, clones of an object may be modified by altering the color of clones. Thus, the cloning of objects makes it possible to present a clone of an object to each avatar in the viewable area of the object to increase the visibility of the object. Cloning objects also increases the value of objects within a virtual universe because the visibility of these objects is improved.

In an illustrative embodiment, object color modifications may be implemented for each avatar in the range of the object. In this embodiment, clones of the object are generated for each avatar in the range of the object. The rendering of each clone is modified according to the particular circumstances of each avatar. Thus, users having different display settings may be presented with a clone whose coloring compensates for individual settings. In an alternate embodiment where cloning is not implemented, color modifications may be calculated as an average optimal rendering for a subset of user display settings. Thus, for example, the effect of just contrast settings on an object may be determined and addressed without regard to other display settings, such as hue or brightness.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable data storage medium providing program code for use by or in connection with a computer or any instruction execution system. For the purposes of this description, a computer-usable or computer readable data storage medium can be any tangible apparatus that can store, the program for use by or in connection with the instruction execution system, apparatus, or device.

The medium can be an electronic, magnetic, optical, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for modifying display of a first object in a display of part of a virtual universe, the method comprising:
    a computer obtaining tracking data that identifies an average distance of a plurality of avatars on the display to the first object;
    the computer, based on the tracking data:
        the computer determining a difference between current visual settings for displaying the first object and more optimal visual settings for displaying the first object;
        the computer calculating, based on the difference, one or more modifiers to a value of a pixel color of the first object in response to a set of the plurality of avatars entering a defined detection area of the virtual universe where the first object is not viewable by the set of the plurality of avatars, wherein the defined detection area is outside a defined viewable region where the first object is viewable; and
    the computer modifying a color of the first object by applying the one or more modifiers to the value of the pixel color;
    after the modifying step, the computer displaying the first object with the modified color for a predefined period of time on the display such that the first object is displayed according to the more optimal visual settings for the first object for the predefined period of time; and
    the computer determining that the display of the first object is adjacent to a second object that obstructs the first object from view, and in response, the computer changing a current viewable region of the virtual universe on the display to center on a different location than the location of the first object.

2. The method of claim 1, further comprising:
    the computer detecting that a number of objects in a region of the virtual universe exceeds a threshold, and in response, the computer selecting a method for collecting the current visual settings responsive to a user login and further responsive to one or more changes to the current visual settings.

3. The method of claim 1, wherein the current visual settings comprise saturation, brightness, contrast, hue, and primary color settings, and wherein the one or more modifiers include primary color modifiers.

4. The method of claim 3, wherein the calculating step is performed responsive to a difference between a primary color value in the primary color settings and an optimal primary color value of the first object exceeding a predefined threshold.

5. The method of claim 1, wherein the modifying step is performed in response to the set of the plurality of avatars entering the defined viewable region where the first object is viewable.

6. A computer program product for modifying display of a first object in a display of part of a virtual universe, the computer program product comprising:
    one or more computer-readable storage devices, and program instructions stored on the one or more storage devices, the program instructions comprising:
    program instructions to obtain tracking data that identifies an average distance of a plurality of avatars on the display to the first object;
    program instructions, based on the tracking data, to:
        determine a difference between current visual settings for displaying the first object and more optimal visual settings for displaying the first object;
        calculate, based on the difference, one or more modifiers to a value of a pixel color of the first object in response to a set of the plurality of avatars entering a defined detection area of the virtual universe where the first object is not viewable by the set of the plurality of avatars, wherein the defined detection area is outside a defined viewable region where the first object is viewable; and
    modify a color of the first object by applying the one or more modifiers to the value of the pixel color;
    after the modifying, program instructions to display the first object with the modified color for a predefined period of time on the display such that the first object is displayed according to the more optimal visual settings for the first object for the predefined period of time; and program instructions to determine that the display of the first object is adjacent to a second object that obstructs the first object from view, and in response, program instructions to change a current viewable region of the virtual universe on the display to center on a different location than the location of the first object.

7. The computer program product of claim 6, further comprising:
program instructions to detect that a number of objects in a region of the virtual universe exceeds a threshold, and in response, program instructions to select a method for collecting the current visual settings responsive to a user login and further responsive to one or more changes to the current visual settings.

8. The computer program product of claim 6, wherein the current visual settings comprise saturation, brightness, contrast, hue, and primary color settings, and wherein the one or more modifiers include primary color modifiers.

9. The computer program product of claim 8, wherein the program instructions to calculate one or more modifiers to the value of the pixel color calculate responsive to a difference between a primary color value in the primary color settings and an optimal primary color value of the first object exceeding a predefined threshold.

10. The computer program product of claim 6, wherein the program instructions to modify the color of the first object by applying the one or more modifiers to the value of the pixel color are executed to modify the color of the first object by applying the one or more modifiers to the value of the pixel color in response to the set of the plurality of avatars entering the defined viewable region where the first object is viewable.

11. A computer system for modifying display of a first object in a display of part of a virtual universe, the computer system comprising:
one or more processors, one or more computer-readable memories and one or more computer-readable storage devices, and program instructions, stored on the one or more storage devices for execution by the one or more processors via the one or more memories, the program instructions comprising:
program instructions to obtain tracking data that identifies an average distance of a plurality of avatars on the display to the first object;
program instructions, based on the tracking data, to:
determine a difference between current visual settings for displaying the first object and more optimal visual settings for displaying the first object;
calculate, based on the difference, one or more modifiers to a value of a pixel color of the first object in response to a set of the plurality of avatars entering a defined detection area of the virtual universe where the first object is not viewable by the set of the plurality of avatars, wherein the defined detection area is outside a defined viewable region where the first object is viewable; and
modify a color of the first object by applying the one or more modifiers to the value of the pixel color;
after the modifying, program instructions to display the first object with the modified color for a predefined period of time on the display such that the first object is displayed according to the more optimal visual settings for the first object for the predefined period of time; and
program instructions to determine that the display of the first object is adjacent to a second object that obstructs the first object from view, and in response, program instructions change a current viewable region of the virtual universe on the display to center on a different location than the location of the first object.

12. The computer system of claim 11, further comprising:
program instructions to detect that a number of objects in a region of the virtual universe exceeds a threshold; and
program instructions to select, responsive to a user login and to one or more changes to the current visual settings, a method for collecting the current visual settings.

13. The computer system of claim 11, wherein the current visual settings comprise saturation, brightness, contrast, hue, and primary color settings, and wherein the one or more modifiers include primary color modifiers.

14. The computer system of claim 11, further comprising:
program instructions to calculate the one or more modifiers responsive to a difference between a primary color value in the primary color settings and an optimal primary color value of the first object exceeding a predefined threshold.

15. The method of claim 1, further comprising:
instantiating, by the computer, a clone of the first object for each one of the set of the plurality of avatars entering the defined detection area where the first object is not viewable.

16. The method of claim 15, further comprising:
presenting, by the computer, the clone of the first object instantiated for each one of the set of the plurality of avatars entering the defined viewable region to corresponding avatars in the set of the plurality of avatars to facilitate viewing of the first object by the corresponding avatars.

17. The method of claim 1, further comprising:
the computer detecting a movement of one of the plurality of avatars in the virtual universe from the defined detection area into the defined viewable region, wherein the defined detection area surrounds the defined viewable region; and
responsive to the one of the plurality of avatars moving from an outside zone that is adjacent to the defined detection area into the defined detection area:
the computer triggering an initiation process;
wherein, during the initiation process, the computer begins preparations to display the first object to the one of the plurality of avatars in response to the one of the plurality of avatars moving into the defined detection area without displaying the first object during the preparations; and
wherein the one of the plurality of avatars is incapable of viewing the first object while the one of the plurality of avatars is in the defined detection area and while the one of the plurality of avatars is in the outside zone.

18. The method of claim 17, wherein the computer begins the preparations by caching content associated with the first object, and wherein the method further comprises the step of the computer displaying the cached content in response to the one of the plurality of avatars moving into the defined viewable region.

19. The computer program product of claim 6, further comprising:
program instructions to detect a movement of one of the plurality of avatars in the virtual universe from the defined detection area into the defined viewable region, wherein the defined detection area surrounds the defined viewable region; and
program instructions responsive to the one of the plurality of avatars moving from an outside zone that is adjacent to the defined detection area into the defined detection area, to trigger an initiation process during which preparations are begun to display the first object to the one of the plurality of avatars in response to the one of the plurality of avatars moving into the defined detection area without displaying the first object during the preparations, wherein the one of the plurality of avatars is incapable of viewing the first object while the one of the plurality of avatars is in the defined detection area and while the one of the plurality of avatars is in the outside zone.

20. The computer program product of claim 19, wherein the preparations are begun by caching content associated with the first object, and wherein the computer program product further comprises program instructions to display the cached content in response to the one of the plurality of avatars moving into the defined viewable region.

* * * * *